(12) United States Patent
Taylor

(10) Patent No.: US 10,882,766 B2
(45) Date of Patent: Jan. 5, 2021

(54) WATER TREATMENT SYSTEM HAVING TUBULAR MODULES

(71) Applicant: Adam Taylor, Troy, MI (US)

(72) Inventor: Adam Taylor, Troy, MI (US)

(*) Notice: Subject to any disclaimer, the term of this patent is extended or adjusted under 35 U.S.C. 154(b) by 868 days.

(21) Appl. No.: 15/269,630

(22) Filed: Sep. 19, 2016

(65) Prior Publication Data

US 2017/0081220 A1 Mar. 23, 2017

Related U.S. Application Data

(60) Provisional application No. 62/355,864, filed on Jun. 28, 2016, provisional application No. 62/220,692, (Continued)

(51) Int. Cl.
| | |
|---|---|
| C02F 1/46 | (2006.01) |
| C02F 1/465 | (2006.01) |
| C02F 1/463 | (2006.01) |
| C02F 1/24 | (2006.01) |
| C02F 1/467 | (2006.01) |
| C02F 1/52 | (2006.01) |
| C02F 103/20 | (2006.01) |
| C02F 101/20 | (2006.01) |

(Continued)

(52) U.S. Cl.
CPC ............ C02F 1/465 (2013.01); C02F 1/24 (2013.01); C02F 1/463 (2013.01); C02F 1/4676 (2013.01); C02F 1/52 (2013.01); C02F 2001/46152 (2013.01); C02F 2101/103 (2013.01); C02F 2101/105 (2013.01); C02F 2101/108 (2013.01); C02F 2101/20 (2013.01); C02F 2101/22 (2013.01); C02F 2101/32 (2013.01); C02F 2101/36 (2013.01); C02F 2103/20 (2013.01); C02F 2201/46105 (2013.01); C02F 2201/46165 (2013.01); C02F 2209/10 (2013.01); C02F 2301/026 (2013.01); Y02W 10/37 (2015.05)

(58) Field of Classification Search
CPC .. C02F 1/465; C02F 1/463; C02F 1/24; C02F 1/52; C02F 2301/026; C02F 2001/46152; C02F 2201/46105
See application file for complete search history.

(56) References Cited

U.S. PATENT DOCUMENTS 7,226,542 B2 6/2007 Zemel et al.
7,682,492 B2 3/2010 Bradley
(Continued)

FOREIGN PATENT DOCUMENTS

RU 2307797 C2 10/2007
RU 2383382 C2 3/2010
(Continued)

Primary Examiner — Arun S Phasge
(74) Attorney, Agent, or Firm — Young Basile Hanlon & MacFarlane, P.C.

(57) ABSTRACT

A water remediation and treatment device that includes a process channel having fluid inlet and a fluid outlet; at least one tube unit in fluid communication with the process channel, the tube unit defining an interior chamber defining an interior fluid flow path, at least one anode and at least one cathode contained in the interior chamber and positioned in the interior fluid flow path; and at least one device configured to remove material accumulated on the surface of the cathode and/or the electrode during water treatment.

18 Claims, 23 Drawing Sheets

Related U.S. Application Data filed on Sep. 18, 2015, provisional application No. 62/220,714, filed on Sep. 18, 2015.

(51) Int. Cl.
>   *C02F 1/461* (2006.01)
>   *C02F 101/10* (2006.01)
>   *C02F 101/32* (2006.01)
>   *C02F 101/36* (2006.01)
>   *C02F 101/22* (2006.01)

(56) References Cited

U.S. PATENT DOCUMENTS

| | | | |
|---|---|---|---|
| 2004/0251213 A1* | 12/2004 | Bradley | C02F 1/463 205/676 |
| 2011/0308962 A1* | 12/2011 | Eckelberry | C25B 1/003 205/340 |
| 2014/0027271 A1 | 1/2014 | Berrak et al. | |
| 2015/0251932 A1* | 9/2015 | Laaroussi | C02F 1/463 205/701 |

FOREIGN PATENT DOCUMENTS

| | | |
|---|---|---|
| SU | 812738 A1 | 3/1981 |
| WO | 2001/002626 A1 | 1/2001 |
| WO | 2012/100322 A1 | 8/2012 |
| WO | 2014/0027271 A2 | 2/2014 |
| WO | 2014/047726 A1 | 4/2014 |

* cited by examiner

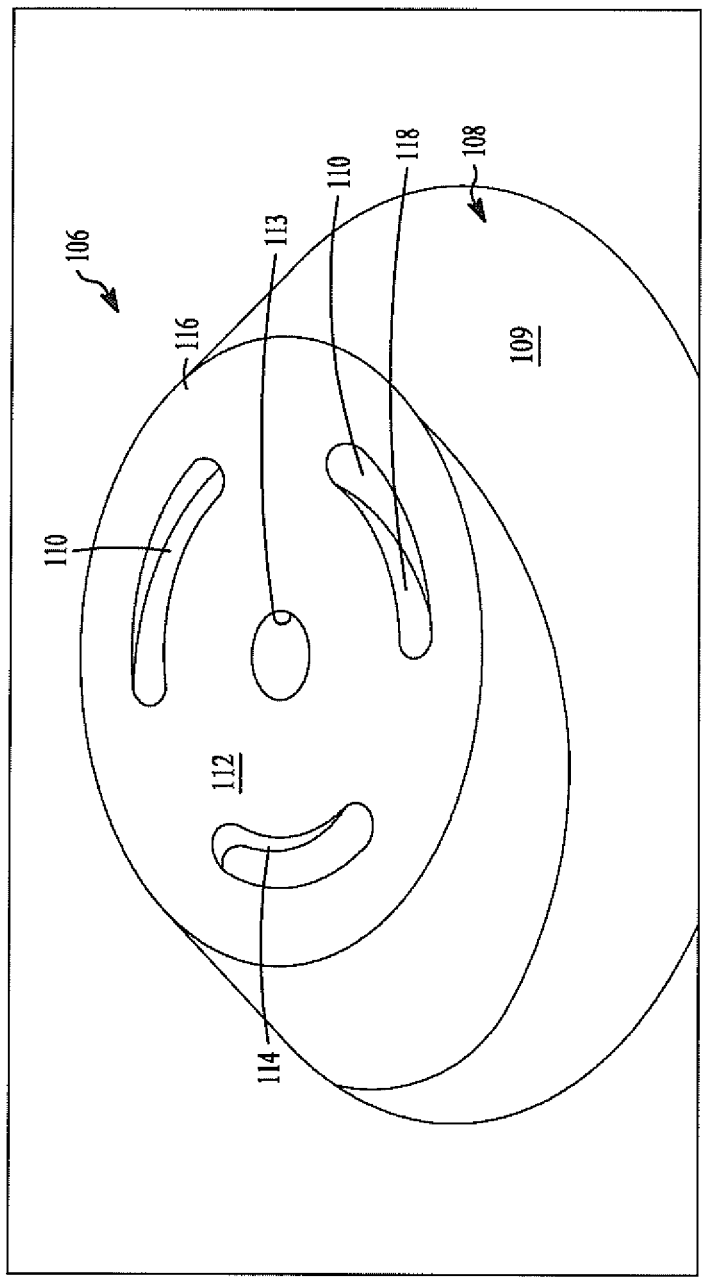
FIG. 7A
FIG. 7B

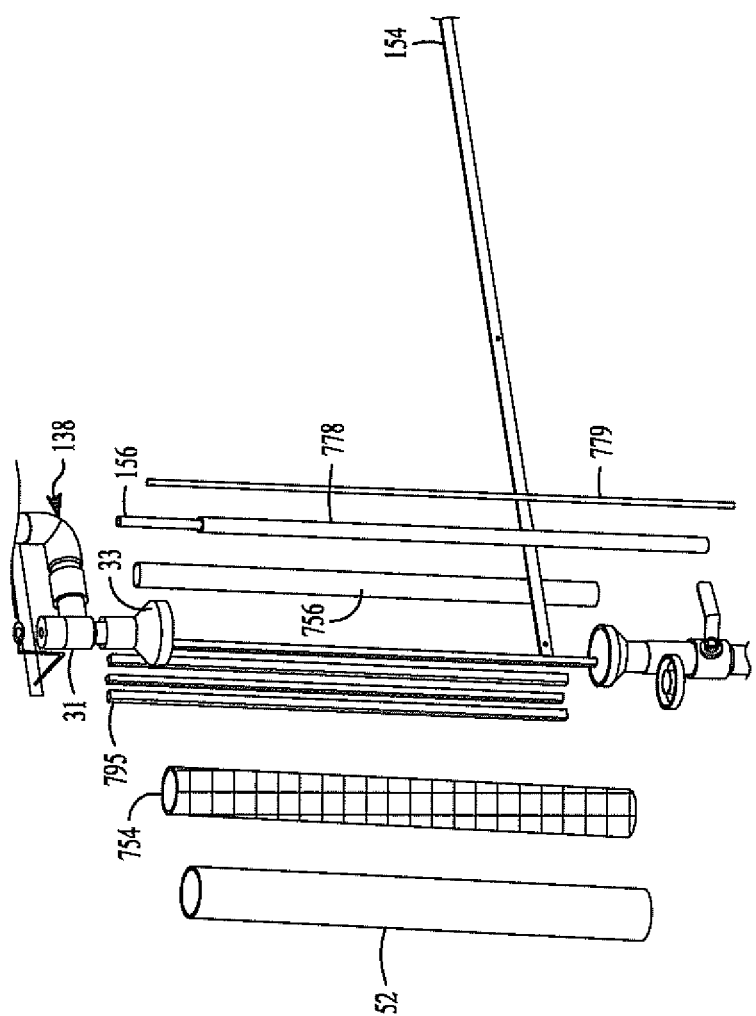

WATER TREATMENT SYSTEM HAVING TUBULAR MODULES

CROSS-REFERENCE TO RELATED APPLICATIONS

This application claims priority to U.S. Provisional Patent Application No. 62/220,692, filed Sep. 18, 2015; 62/220,714, filed Sep. 18, 2015; and 62/355,864, filed Jun. 28, 2016, the contents of which are incorporated herein by reference.

BACKGROUND

The present invention relates to methods and devices for water treatment.

The need to treat and remediate process water is well-appreciated in various industries including, but not limited to, aquaculture, terrestrial agriculture. Various methods and devices have been proposed. However, the need to provide effective, energy efficient devices, systems and subsystems for water treatment and remediation is still largely unmet.

It would be desirable to provide a device for water remediation and treatment that was robust, effective, energy efficient and can be used in a variety of applications. It is also desirable to provide a device that can be used as a subsystem for use in various water remediation and/or treatment systems.

SUMMARY

Disclosed herein is a water remediation and treatment device and system that can be used in various applications. These include but not limited agriculture and aquaculture operations such as commercial fish and/or crustacean farming. The water remediation and treatment device that is disclosed can have application in treating and remediating water used in industrial purposes such as process water used oil production and hydrofracking, process water used in various surface treatment processes, various cleaning procedures producing grey water and the like. Other water treatment and remediation processes are contemplated within the purview of this disclosure.

The device disclosed herein includes a modular tube unit having that is configured to be mounted to a suitable support structure. The support structure can be a stationary structure, a sidewall of a truck or trailer or an enclosed standing frame structure. It is contemplated that the tube unit can be composed of a single tube device or can be a plurality of tubes that can be arranged in parallel or series.

The plurality of tubes each have at least one anode and cathode operatively connected to the respective tube and housed in a protective cavity defined in the associated tube structure. The anode and cathode can comprise at least one electroactive material. Each tube unit is configured with means to mechanically and/or electromechanically remove deposits and build up that collects on the surface of the electrode material. In certain applications, the electrode itself is configured with means to mechanically or electro mechanically remove deposits and build up on the electrode surfaces. The build-up removal means it can function during defined intervals during the duty cycle of the device.

Also disclosed is a water remediation and treatment device and method that includes a process channel having fluid inlet and a fluid outlet; at least one variable electro precipitation/electro coagulation unit in fluid communication with the process channel, the electro precipitation/electro coagulation unit defining an interior chamber defining an interior fluid flow path, at least one anode and at least one cathode contained in the interior chamber and positioned in the interior fluid flow path; and at least one device configured to isolate material accumulated from the electro precipitation/electrocoagulation process.

BRIEF DESCRIPTION OF THE DRAWING

In the present disclosure reference is made to the following various drawings in which like reference numerals are used for like elements throughout the various figures. The drawing figures are for illustrative purposes only and include the following:

FIG. 7A is a perspective view of a first embodiment of a lower insert member configured as a fluid flow adapter that can be employed in an embodiment of the water remediation tube assembly of FIG. 3;

FIG. 7B is a cross-sectional view of FIG. 7A;

FIG. 15 is an exploded view of an alternate embodiment of a reaction tube assembly as disclosed herein;

FIG. 16 B is a cross-sectional view taken along the 16-16 line in FIG. 16 A with the alternate embodiment of the electrode in position in the reaction tube assembly;

DETAILED DESCRIPTION

Disclosed herein is a water remediation and treatment device and components that can be employed to reduce and/or eliminate at least one target contaminant present in an aqueous stream as well as a method for accomplishing the same. As broadly disclosed herein, the device includes at least one reaction chamber positioned in contact with a process stream to be treated. The reaction chamber is configured to induce turbulent flow in the introduced process stream and promote contact between contaminants present in the aqueous stream and electroactive surfaces within the reaction chamber. The contaminants present in the aqueous stream can also be brought into contact with oxygen present in the process stream, a portion of which can be introduced due to turbulent flow.

The device as disclosed herein can function as an efficient cost-effective water treatment and remediation system for use in a variety of industries and applications, including but not limited to, oil and gas production, metal plating operations, acid mine drainage, agricultural operations, textile treatment, heavy manufacturing operations and the like. the process and device can be employed to treat a wide range of industrial, agricultural and commercial waste streams contaminated with heavy metals, microorganisms, bacteria, pesticides, arsenic, MTBE, cyanide, biological oxygen demand (BOD), total dissolved solids (TDS), total suspended solids (TSS), nitrogen, phosphate, and other biological nutrients and has been suggested as a cost effective, efficient method for coagulation of organic and biologically derived materials such as algae biomass for first stage pre-concentration and dewatering.

Also disclosed is a process or method for remediating water that includes the steps of activating at least one anode and at least one cathode present in a reaction tube assembly and introducing an aqueous process stream into contact with the at least one activated cathode and the at least one activated anode. The aqueous process stream can be maintained in contact with the at least one activated cathode and the at least one activated anode for an intervals sufficient to trigger linear electrofloatation of at least one target contaminant present in the aqueous process stream. The electrofloatation process can result in the generation of at least one gaseous by-product such as oxygen and/or hydrogen. If the by-product is oxygen, the oxygen by-product is directed into the aqueous process stream downstream of the anode and cathode. If the by-product is hydrogen, at least a portion of the hydrogen can be directed to a hydrogen storage cell located remote to the reaction tube assembly.

Figure 1:
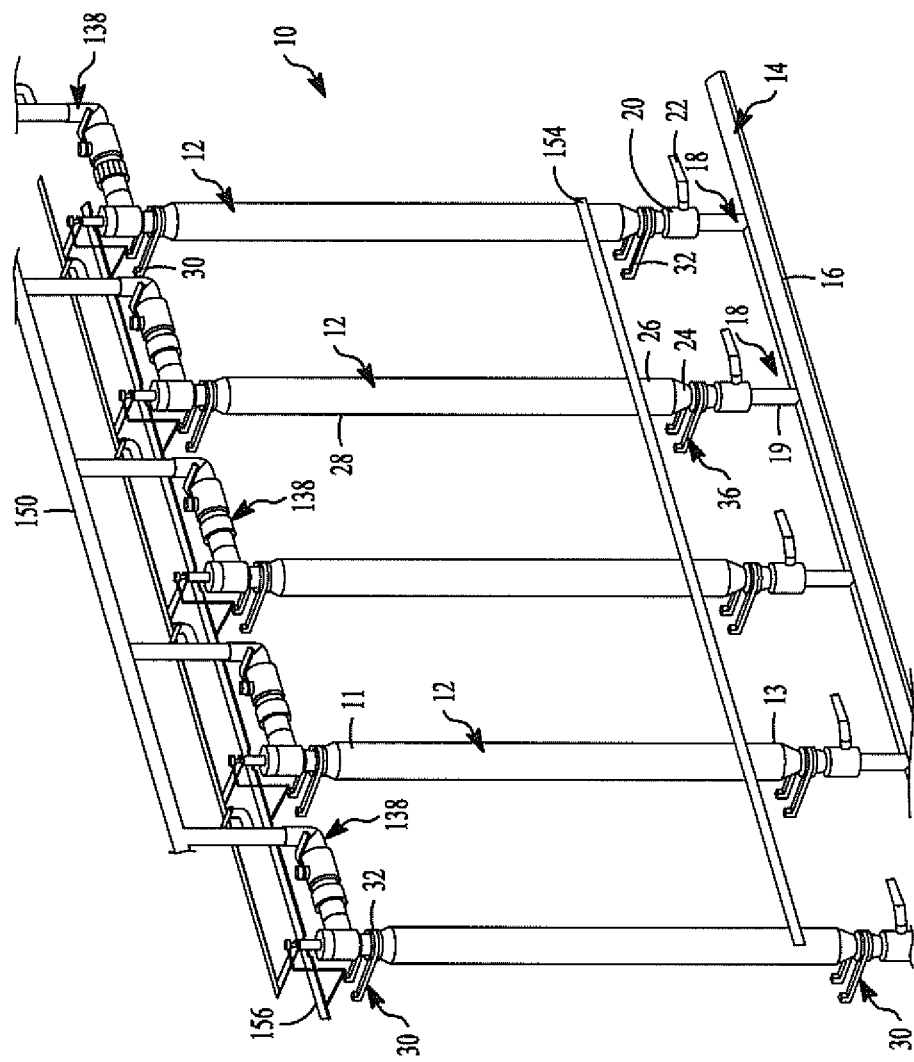
FIG. 1 is a perspective view of a first embodiment of the water remediation device stack as disclosed herein.

The process and system proposed is robust, effective, energy efficient and can be used in a variety of applications and can be employed as a stand-alone system or can be employed as a subsystem for use in various water remediation and/or treatment systems In the embodiment depicted in FIG. 1, the device 10 broadly includes one or more reaction chambers configured as reaction tube assemblies 12 that are positioned in fluid contact with a suitable process stream. The device 10 includes an inlet assembly 14 that can include a main inlet pipe 16 to which one to more of the reaction tube assemblies 12 are operatively connected. Where multiple reaction tube assemblies 12 are employed, the reaction tube assemblies can be connected to the main inlet pipe in parallel, in series or in any suitable combination of parallel or series connection. In the embodiment depicted in FIG. 1, the reaction tube assemblies are connected in parallel.

The one or more reaction tube assemblies 12 can be connected to the main inlet pipe 16 by any suitable means; non-limiting examples of which include threaded fittings, soldering and the like that are capable of achieving a fluid tight junction. The main inlet pipe 16 is configured to convey the fluid stream such as the process effluent to be treated from a source or sources into the one or more reaction tube assemblies 12 that are present and on line in the device 10. The device 10 will include suitable means for directing the effluent process stream through one or more reaction tube assemblies 12 in either a sequential or parallel process as desired or required for specific treatment parameters.

In the embodiment depicted in the various drawing figures, the inlet directing means can include reaction tube inlets 18. In the embodiment as depicted, a given reaction tube inlet 18 assemblies will be coupled to each respective reaction tube assembly 12. It is also within the purview of the present disclosure that multiple reaction tube assemblies 12 can be associated with a specific reaction tube inlet 18 in certain embodiments if desired or required.

The respective reaction tube assemblies 12 are generally elongated cylindrical members having a first end region 11 and an opposed second end region 13. In the use position, the first end region 11 is oriented above the second end region 13.

The reaction tube inlets 18 are in fluid contact with the main inlet pipe 16. The reaction tube inlets 18 each can be configured with means for isolating the associated reaction tube assembly 12 from the process stream for an interval or intervals. In the embodiment as illustrated, each reaction tube inlet assembly 18 has an inlet pipe 19 configured with an inlet valve 20 that is moveable between an open and closed position. Where desired or required, the inlet valve 20 is ball valve assembly that can include a suitable actuator such as handle 22 for manual implementation between the open and closed positions. It is also contemplated that the inlet valve 20 in the reaction tube inlet assembly 18 can be electronically actuated, if desired or required. In certain embodiments, the second ends of at least two reaction tube assemblies 12 are in fluid connection with one another.

The reaction tube inlet 18 can also be equipped to facilitate disconnection and replacement of one or more reaction tube assemblies 12. In the embodiment illustrated in FIG. 6, the reaction tube inlet 18 includes a quick disconnect member 24 that is located downstream of the inlet valve 20. The quick disconnect member 24 can matingly engage a suitable mating quick disconnect member 26 associated with the respective reaction tube assembly 12 to facilitate the ready removal and replacement of one or more reaction tube assembly(ies) 12 as desired or required. In certain embodiments, it is contemplated that the quick disconnect member 24 that is associated with the reaction inlet assembly 18 can be a female member configured to engage a corresponding male member associated with the associated reaction tube assembly 12 in a fluid tight matter.

It is contemplated that when the device 10 is in the use position, the reaction tube assembly(ies) 12 can be anchored to a suitable structure such as a side wall or the like. The side wall can be a structural member of a building such as a wall or the like. In other embodiments, the structural member wall or element of a larger container rendering the device 10 transportable from site to site.

The device 10 can include suitable anchor devices to maintain the unit relative to the wall or other support structure. In the embodiment depicted in FIG. 1, the device 10 can include anchor devices 30. The device 10 can have one or more anchor devices 30 associated with each reaction tube assembly 12. In the embodiment depicted in FIG. 1, an anchor device is positioned in the general region of the at opposed first end region 11 and second end region 13 of each respective reaction tube assembly 12.

Figure 2A:
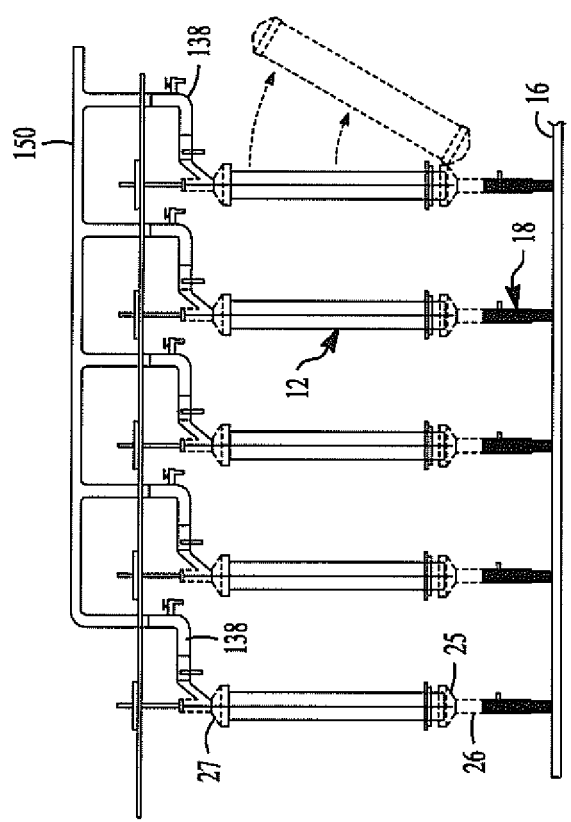
FIG. 2A is a side view of an embodiment of the water remediation device stack of FIG. 1 in partial cutaway.
Figure 2B:
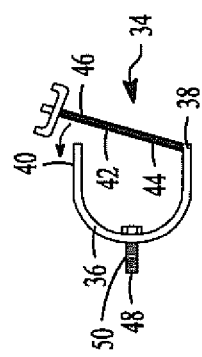
FIG. 2B is a plan view of an embodiment of an anchor device as employed in FIGS. 1 and 2A.

The anchor device(s) can be suitably configured to maintain the respective reaction tube assemblies 12 in position during operation. The anchor devices 30 can be tie straps 32 such as depicted in FIG. 1. An alternate embodiment of anchor device 30 is illustrated in FIG. 2B as a clip member 34. Clip member 34 can include a C-body 36 having first end 38 and second end 40. A cross member 42 having a first end 44 is pivotally attached to first end 38 of the C-body 36. The opposed second end 46 is configured to be maintained in removable engagement with second end 40 of C-body 36 and can include a suitable clamp such as a wing nut, a living hinge or the like. The outer body of an associated reaction tube assembly 12 can be removably contained in the interior region defined by the C-body 36. The cross member 42 can be pivoted into engagement with the second end 40 of the C-body 36 to maintain the associated reaction tube assembly 12 in engagement with the C-body 36.

The C-body 36 can also include an anchor member 48 configured to engage the associated support structure such as a wall member or the like. In the embodiment depicted, the anchor member 48 can be a projection extending outward from the C-body 36 at a location medial and distal to its first end 38 and second end 40. At least a portion of the external surface of the projection is configured with a wall engaging surface. In the embodiment depicted, the external surface of the anchor member 48 has a spirally threaded region 50.

Figure 2C:
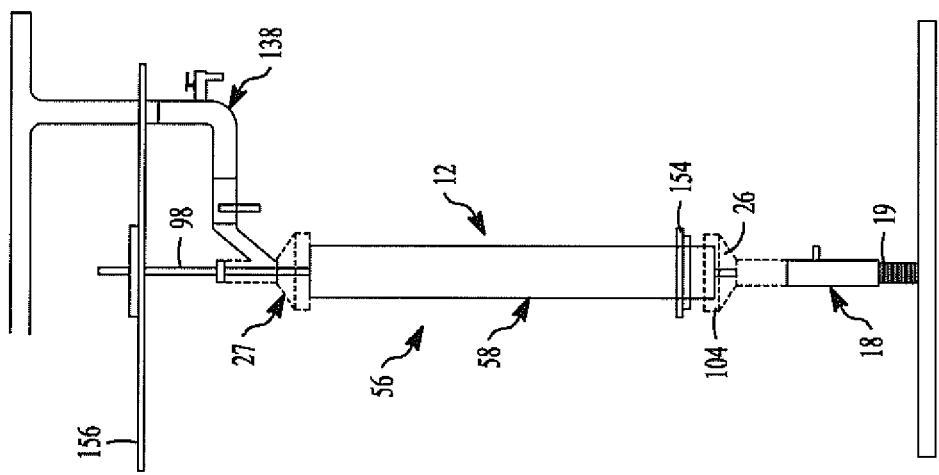
FIG. 2C is a detail view of a water remediation tube of FIG. 1.

The individual reaction tube assembly(ies) 12 include a suitable reaction chamber through which the process stream can pass. In the embodiment as depicted in FIG. 1, the individual reaction tube assembly(ies) 12 can be composed of a reaction chamber 52 that includes an outer elongated housing 54. It is contemplated that the reaction chamber 52 can have a configuration that will support and promote process water treatment and fluid flow. In various embodiments, at least a portion of the reaction chamber can be configured as a cylinder. The outer elongated housing 54 can be configured to support and maintain the reaction chamber 52. In the embodiment depicted in FIGS. 1, 2 and 3 and in FIG. 6, the outer elongated housing 54 can be tubular and can be composed of a suitable non-reactive, fluid-tight protective material. The outer elongated housing 54 is generally tubular in configuration. However other configurations are contemplated. In certain embodiments, it is contemplated that the outer surface of one or more reaction tube assemblies 12 can have various geometric configurations while the inner surface will be cylindrical or generally cylindrical in shape.

Suitable electrodes are disposed with in the one or more reaction tube assemblies 12. In the embodiments disclosed herein one or more electrodes are disposed within the chamber defined in the outer elongated housing 54 and can be concentrically disposed within the elongated chamber defined within the outer elongated housing 54.

Figure 3:
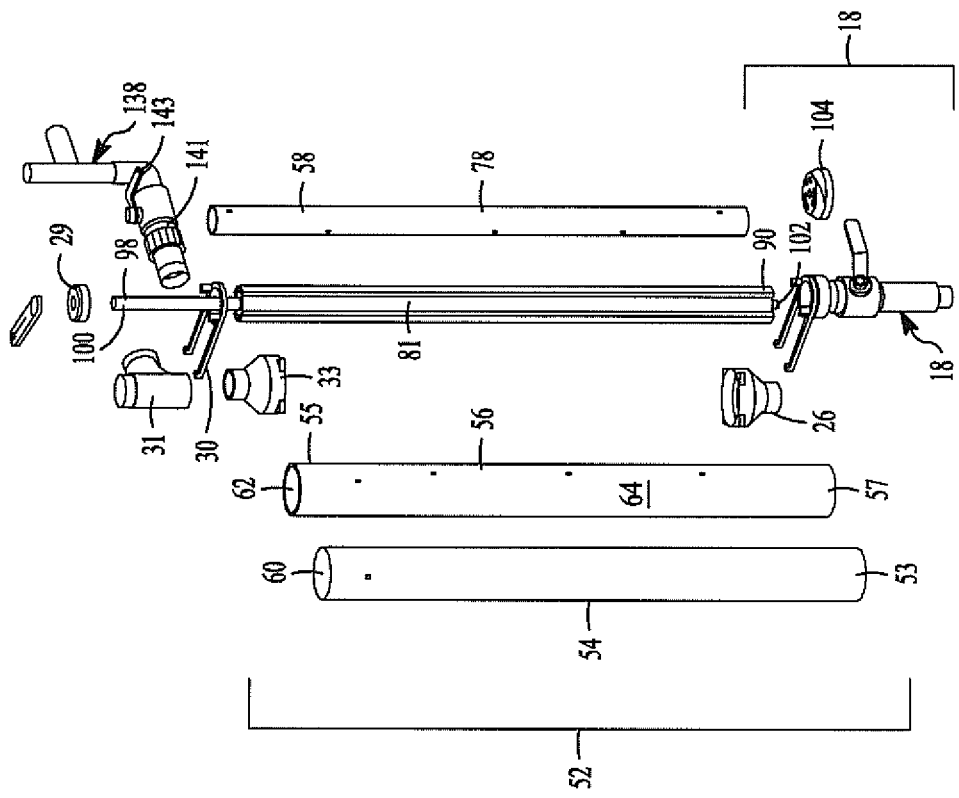
FIG. 3 is an exploded view of an embodiment of a water remediation tube assembly of FIG. 1.
Figure 4:
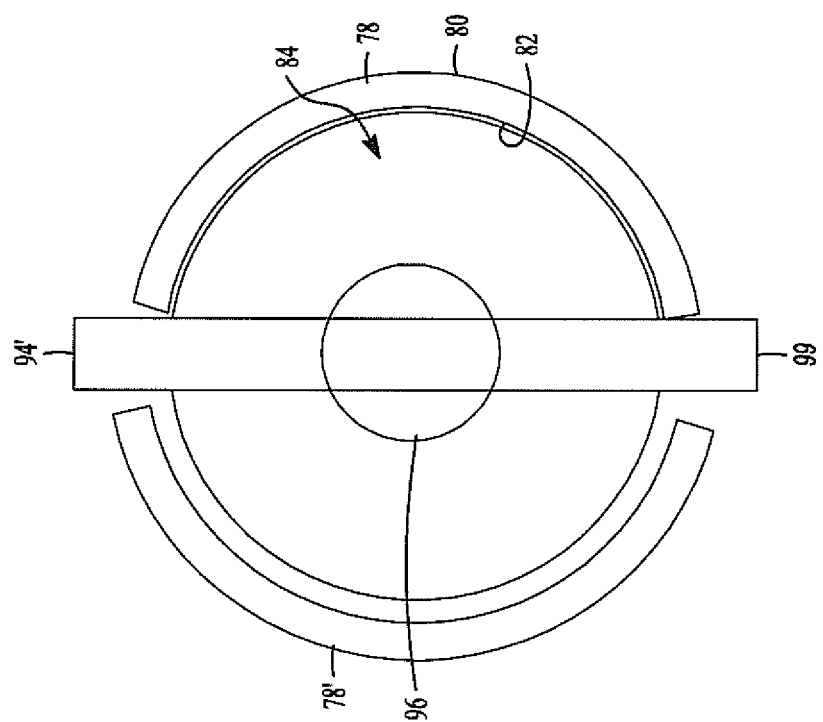
FIG. 4 is a top view take through the 4-4 line in FIG. 1.
Figure 5A:
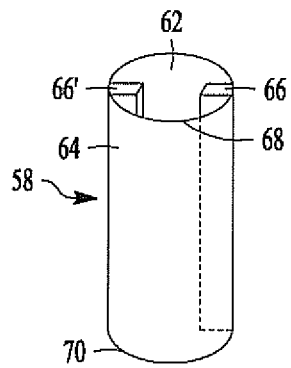
FIG. 5A is a perspective view of an embodiment of an outer electrode of FIGS. 1 and 2.
Figure 5B:
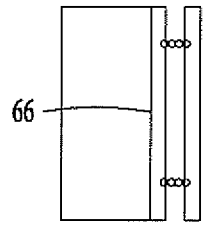
FIG. 5B is a detail view of a portion of the outer electrode of FIG. 5A.
Figure 5C:
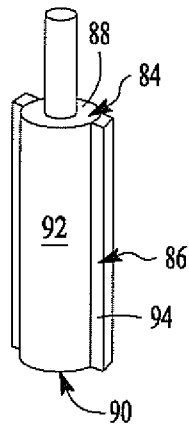
FIG. 5C is a perspective view of an embodiment of an inner support rod as disclosed herein.
Figure 5D:
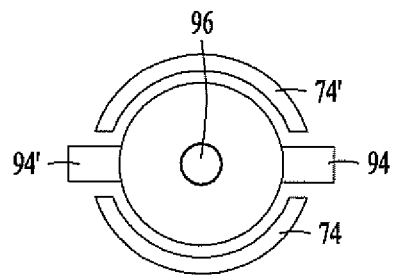
FIG. 5D is a cross-sectional view of an embodiment of an inner electrode and an embodiment of a support rod assembly as disclosed herein.

In the embodiment, depicted in FIGS. 3, 4 and 5, an outer electrode member 56 and inner electrode member 58 are concentrically disposed within the outer elongated housing 54. At least one of the outer electrode member 56 or the inner electrode member 58 is formed as a cylindrical tubular member. In the embodiment illustrated, the outer electrode member 56 is a cylindrical tubular member and is concentrically oriented as spaced distance from the inwardly oriented surface 60 of outer elongated housing 54 to provide contact between the introduced effluent and both the inwardly oriented surface 62 and the outwardly oriented surface 64 of the outer electrode member 56.

The outer electrode member 56 can be configured with at least one ridge 66 that projects inwardly from the inwardly oriented surface 62 of the outer electrode member 56 to a point distal to the inwardly oriented surface and extend longitudinally relative to the outer electrode member 56. In the embodiment depicted in FIGS. 5 A and B, the outer electrode member 56 has at least two longitudinally extending ridges, ridge 66 and ridge 66' that extend from an upper edge region 68 of the outer electrode member 56 to a lower edge region 70. The ridges 66, 66' can have a suitable dimensional height from the inwardly oriented surface 62 to the distal surface 72 to contact the outer surface 74 of inner electrode member 58. The width of the ridge 66, 66' will be that suitable to provide dimensional stability to the ridge 66, 66' during relative rotational movement of the outer electrode member 56 relative to the inner electrode member 58. The width of the ridge 66, 66' can be between 0.5 degrees and 15 degrees of the circumference of the outer electrode. 58. While the longitudinally extending ridges 66 may be located at any positioned on the inwardly oriented surface 62, in certain embodiments where the outer electrode 56 has two ridges 66, 66', the two ridges 66, 66' can be positioned at 180° opposition to one another.

The inner electrode member 58 can be configured as a tubular member that is concentrically disposed interior to the outer electrode member 56. In the embodiment as depicted in the drawing figures, the inner electrode member 58 is composed of two or more curved portions 76. In the embodiment depicted in the drawing figures, the inner electrode member 58 has two elongated generally semicircular or curved elements 78, 78'. When the two curved elements 78, 78' are in position, the curved elements 78, 78' form the inner electrode member 58 that is concentrically disposed interior to the outer electrode member 56. The curved elements 78, 78' are configured to have an outer convex surface 80 and a concave inner surface 82 when oriented in the use position.

In the embodiment depicted in the various drawing figures, the curved elements 78, 78' of the inner electrode member 58 are connected to a support member 84 in a suitable manner. When connected to the support member 84, the curved elements 78, 78' can be positioned a spaced distance from the support member 84 sufficient to facilitate process flow and treatment. In certain embodiments, connection can be accomplished by a suitable adjustable connection member or members (not shown) that can offset the concave inner surface 82 at a spaced distance from the support member 84 and provides variable adjustment of the electrode spacing depending on water and process conditions. Adjustment can be accomplished by manual, electromechanical or other means. In the embodiment as depicted in the drawing figures, the adjustment device can be a series of screws or the like.

Support member 84 can be configured as a cylindrical member 86 that is concentrically disposed in the outer elongated housing 54. Support rod 84 has a first end 88, an opposed second end 90 lower that the first end 88, an outwardly oriented surface 92 and has at least one projection 94 projecting outward from the outwardly oriented surface 92 of the support member 84 to a location distal thereto to define a distal surface 93. The projection 94 is an elongated member that extends from the first end 88 to the second end 90. The projection 94 is an elongated member that extends from the first end 88 to the second end 90. In certain embodiments, it is contemplated that the projection 94 will be an elongated member that extends longitudinally from first end 88 to second end 90. The projections 94, 94' can be integrally formed with the support member 84. Alternately, the projections 94, 94' can be mounted to the support member by any suitable means.

In various embodiments, the support member 84 can be rod shaped and can include at least two projections 94, 94' that may be located generally equidistant to one another along the perimeter of the support member 84. In the embodiment depicted in FIGS. 5C and 5D, the support rod 84 has two projections positioned 180° opposed to one another.

The inner electrode elements such as curved elements 78, 78' are configured to be positioned between projections 94, 94'. In various embodiments, the projections 94, 94' extend to a height such that the distal surface 93 projects further outward than the outer convex surface 80 of the respective curved elements 78, 78' of inner electrode member 58.

The support member 84 can be made of any suitable material. In various embodiments, support member 84 can be constructed in whole or in part from a suitable electrical insulating material. Non-limiting examples of suitable material include various non-conductive polymers, polymer composites, engineered plastic and the like. In certain embodiments, fiber glass resins can be employed.

Support member 84 can be configured with a through bore 96 that runs coaxially and longitudinally through the body of the support member 84. The support member 84 will have suitable thickness and mass to provide rotational and torsional strength to the projections 94, 94'.

The through bore 96 is configured to receive a power supply service rod 98 longitudinally there through. The power supply service rod 98 has a first end 100 that extends outward beyond the first end 88 of the support member 84 when in the use position. The power supply service rod 98 also has a second end 102 distal to the first end 100. The second end 102 of the power supply service rod 98 extends beyond the second end 90 of the support member 84. The power supply service rod 98 is operatively connected to a suitable power source and produces a negative power supply through the support member 84. The support member 84 can be composed of a suitable electrically conductive material. Non-limiting examples of such electrically conductive materials include various metals and materials impregnated with electro-conductive materials. In certain embodiments, the support member 84 can be anchored to the power supply service rod 98 by any suitable means. Thus axial movement of the power supply service rod 98 can be translated into axial movement of the support member 84 as desired or required.

Each reaction tube assembly 12 can also include a suitable bearing support member such as bearing support member 104. The bearing support member 104 can have any suitable configuration to facilitate positioning and rotational movement of the support member 84, the outer electrode member 56 as well as and any associated elements. The bearing support member 104 can be concentrically disposed proximate to the lower end 53 of the outer elongated housing 54.

In certain embodiments, the bearing support member 104 can be a circular race that defines an interior location. A fluid adapter 106 can be located at a location proximate to the lower end 57 of the outer electrode member 56 and the second end 90 of the support member 84. In certain embodiments, the fluid adapter 106 in the interior location defined by the bearing support member 104.

One non-limiting embodiment of a fluid flow adapter is depicted in FIGS. 7A and 7B. The embodiment depicted, the fluid adapter 106 is a body member 108 having at least one flow channel 110 defined therein. The fluid adapter 106 may also have a tapered outer peripheral edge 109. The flow channels 110 extend from a lower inlet surface (not shown) to an upper outlet surface 112. In the embodiment depicted, the fluid flow adapter 106 has at least two flow channels 110 with flow channel outlets 114 positioned at a spaced distance from one another around the upper outlet surface 112 of the fluid adapter 106. In many embodiments, the flow channel outlets 114 are positioned equidistant from one another on the upper outlet surface 112 of the fluid adapter 106.

The flow channels 110 can have a suitable fluid guidance configuration or geometry. It is contemplated that one or more of the flow channels 110 will be configured with similar coordinating geometries. In the embodiment depicted, the flow channels 110 are configured as arcuate ascending partial spiroids. As used herein, the term "arcuate ascending spiroids" is defined as a channel having a latitudinal arc based on the upper outlet surface 112 between 1° and 180° based on the number of flow channels 110 present in the fluid adapter 106. In embodiments having three flow channels 110, it is contemplated that the spiroids will have a latitudinal arc based on the upper outlet surface 112 that is between 10° and 90° in certain embodiments, with latitudinal arcs between 25° and 75° being employed in certain applications.

The arcuate ascending spiroids present in the fluid adapter 106 have a rise through the body of the fluid adapter 106 that is between +5% to ±25% from a plane parallel to the longitudinal axis. In the embodiment depicted in FIG. 7A, the various flow channels 110 are positioned on a coaxial arc around the perimeter 116 of the fluid adapter 106.

The flow channels 110 can be configured with flow channel outlets 114 having any suitable configuration. In the embodiment depicted, the flow channel outlets 114 are configured as arcuate slots 118 having a tapered lower surface 120 that is contiguous with the internal spiroid channel defined in the body of the fluid adapter 106.

The reaction tube assembly(ies) 12 can also include a lower support housing members 122 that is connected to the outer elongated housing 54 in lower end 105 in a suitable fluid-tight manner. The reaction tube assembly(ies) 12 can also include an upper support housing member 124 that is connected to the upper end 107 in a fluid tight manner. In the embodiment depicted in the drawing figures, the upper support housing member 124 and the lower support housing member 122 each include outer tubular first region 126, 128, respectively. The outer tubular first region 128 can include a male quick connect member (not shown).

The outer tubular first regions 126, 128 each have a first diameter. The respective outer tubular first regions 126, 128 are each integrally connected to a respective outwardly flaring frustoconical region 130, 132 and each terminates in a respective second region 134, 136. The respective second regions 134, 136 have diameters greater than the diameters of the outer tubular first regions 126, 128. The second regions 134, 136 are each configured to contact the respective end regions of the outer support member 154 with outwardly flaring frustoconical regions 130, 132 contacting the outer support member 154 at its lower regions 157 and upper regions 155, respectively.

The second or upper member 129 can be connected to and is in fluid communication with the outlet assembly 138. Outlet assembly 138 can include a T-pipe 140 that can be equipped with a female quick connect member 142 that can mate with the male quick connect present on the reaction tube assembly 12. The outlet assembly 138 can also include a suitable ball valve member 144 or other means to isolate the reaction tube assembly 12 from the process stream. The ball valve can be moveable between a closed and open position by a suitable actuator such as handle 146 and can be configured to prevent back flow to main reaction outlet pipe 150. Where desired or required, the outlet assembly 138 can also be configured with at least one sample port 148 located upstream of main reaction outlet pipe 150. Sample port 148 can be configured as a spigot in certain embodiments.

The main reaction outlet pipe 150 is configured to carry treated water to a main outlet after treatment upon discharge. The sample port 148 allows for samples of treated water coming from the reaction tube assembly 12 to be collected and analyzed.

The device 10 also includes a suitable power service assembly 152 or assemblies that include a suitable negative power service delivery assembly 156 electrically connected to power supply service rod 98. The negative power service delivery assembly 156 also includes a main negative power service delivery line 156 connected to one of the electrode members and a positive power service assembly 154 that supplies positive power to the other electrode member to create concentrically disposed cathode and anode members. The device 10 can be powered by any suitable power source. In certain embodiments, the device can be powered by a 480 v 60 Hz 3 phase power supply allowing for independent control of both the amperage and voltage. The power supply can be located on or proximate to the device 10 and can be regulated by a suitable control panel that can control some or all of the functions of the unit, including but not limited to the amperage and voltage delivered to the electrodes. In certain embodiments, it is contemplated that the electrode will operate in a power range between 20 amps and 350 amps and between 2 volts and 60 volts and can be varied within this range. In certain embodiments, it is contemplated that the power range will be between 40 amps and 250 amps and between 4 volts and 40 volts will be employed.

The device 10 will also include various sensors and monitors that can deliver data and monitor a number of variables. All functions and variables may be monitored or adjusted remotely if desired or required. Non-limiting examples of process variables subject to monitoring and adjustment include aqueous process stream flow rate, the gap between the respective electrodes through which the aqueous process stream passes and the power at which one or both electrodes in an electrode pair operate. In certain embodiments, it is contemplated that the gap between the respective electrodes will be between ⅛ inch and 1 inch, with values between ¼ inch and ¾ inch being employed in certain embodiments.

In operation, water to be treated is delivered to device 10 through main inlet pipe 16 into one or more reaction tube assemblies 12 via associated inlet assembly 14. A portion of the process stream directed to each respective reaction tube assembly 12 passes through the associated reaction tube inlet 18 and into the lower support housing member 122. As the process material enters the frustoconical region 130 triggers a pressure drop in the process stream flow. The process fluid is directed to the space defined between the outer electrode member 56 and the inner electrode member 58. Power is delivered to the electrode members to provide a cathode and anode functionality. Process water passes through the charged environment resulting in electrocoagulation of the contaminants contained in the process stream.

In the certain embodiments, the process fluid flow that can progress is a spiral fashion through the reaction tube assembly 12 which can be produced or facilitated by the fluid adapter 106. The water passes over select electrode media and is treated. From the reaction tube the water flows out of the system via the reaction tube outlet and into the main outlet.

The electrodes can be constructed of carbon, graphite or any number of metals such as iron, titanium, platinum, zinc, aluminum, ruthenium and the like, whether solid or plated, or combinations of materials depending on the desired treatment or application. It is contemplated that the electroactive material can be mounted on suitable support surfaces if desired or required.

The treated process stream can exit the reaction tube assembly 12 through the process outlet assembly 138. The material can be conveyed to subsequent reaction tube assembly(ies) 12 and/or on to the exit depending on processing needs and requirements.

The process outlet assembly 138 can include a process outlet conduit 139 configured to convey the process stream away from the reaction tube assembly 12. During operation, the process outlet conduit is in fluid communication with reaction chamber 51 defined in the reaction chamber 52. In the embodiment depicted in FIGS. 1, 2 and 3, process outlet conduit 139 of process outlet assembly 138 is connected to the reaction tube assembly 12 via quick disconnect member 27. Quick disconnect member 27 is configured to permit operative insertion of power supply service rod 98 therethrough and can include suitable seals 29, sleeves 31 and the like to facilitate operation.

In the embodiment depicted, the quick disconnect member 27 can be removably connected to a suitable frustoconical collection cap 33 that is sealingly connected to the top region 11 of the reaction tube assembly 12 and is opposed to a similarly configured frustoconical diffusion cap 25 that is sealingly connected to the outer elongated housing 54 at the lower region 13 of reaction tube assembly 12. The wider region of the frustoconical diffusion cap 25 can have a suitable interior diameter sufficient to receive bearing support member 104 therein.

As volumes of material are processed, some contaminants can build up on the surface of the electrode material. In order to dislodge and remove contaminants, the inner electrode member 58 can be rotated relative to the outer electrode member 56 such that the outwardly oriented fins or projections 94 contact the inwardly oriented surface 62 of outer electrode member 56. Material dislodged can be removed by any suitable means. In certain embodiments material that is removed from electrode surfaces can be carried by process water to a suitable filtration unit (not shown).

Similarly, the inwardly oriented projections present on the outer electrode member 56 contact the outwardly oriented surface of the inner electrode member 58 as the inner electrode member 58 rotates to remove contaminants from the outwardly oriented surface of the inner electrode member 58.

When a given reaction tube assembly 12 needs to be taken off line for replacement and/or regeneration, the reaction tube assembly 12 can be disengaged from connection with the device 10 at the quick connection devices and be replaced with a different unit as desired or required.

Figure 8:
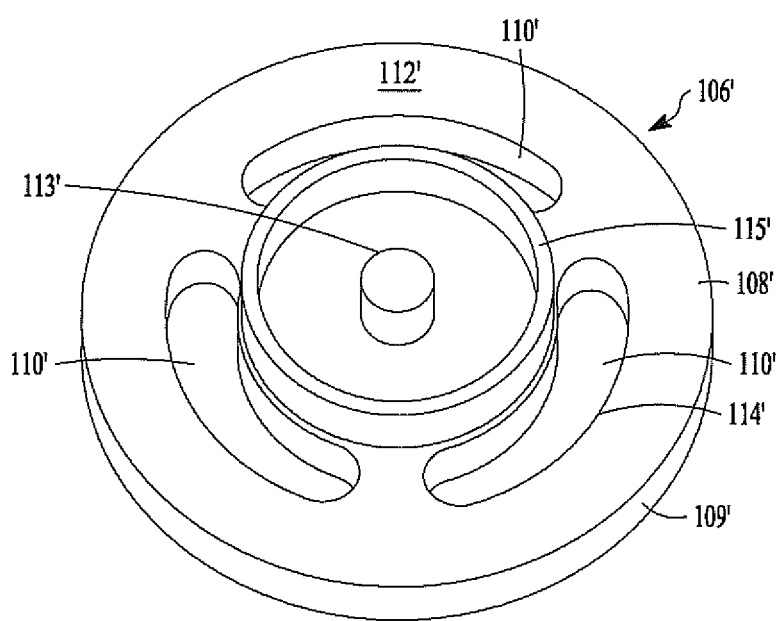
FIG. 8 is a perspective view of a second embodiment of a lower insert member that is configured as a fluid flow adapter that can be employed in the water remediation tube of FIG. 3.

A second embodiment of a lower insert member 106' is depicted in FIG. 8. The lower insert member 106' includes a body member 108' having a peripheral edge surface 109' that has at least one flow channel 110' defined therein. The flow channels 110' extend from a lower inlet surface (not shown) to an upper surface 112'. In the embodiment depicted, the fluid flow adapter 106' has at least two flow channels 110' with outlets 114' positioned at a spaced distance from one another around the upper surface 112' of the insert member 106'. In many embodiments, the outlets 114' are positioned equidistant from one another on the upper surface 112' of the insert member 106'. In the embodiment depicted in FIG. 8 the lower insert member 106' is configured with three flow channels 110'. The flow channels 110' are configured as essentially straight through channels extending from lower face (not shown) to upper face. And are configured to produce multiple flow channels in the water passing therethrough into the associated reaction tube assembly 12.

Where desired or required, the lower insert member 106' can be configured with a central projection 113' defined in the upper surface 112' and projecting into the body there from. The central projection 113' can be configured to receive the lower end of power supply service rod 98 to permit rotational movement about a central axis. The lower insert member 106' also has projection sleeve 115' that projects outward from the upper surface 112'. In certain embodiments, the projection sleeve 115' is oriented coaxial to the central projection 113'. The central projection 113' is configured to engage the lower end of the electrode assembly. The projection sleeve 115' can support the outer peripheral edge of the electrode assembly. The projection sleeve 115' is located interior to the fluid flow channels 110'.

Figure 6:
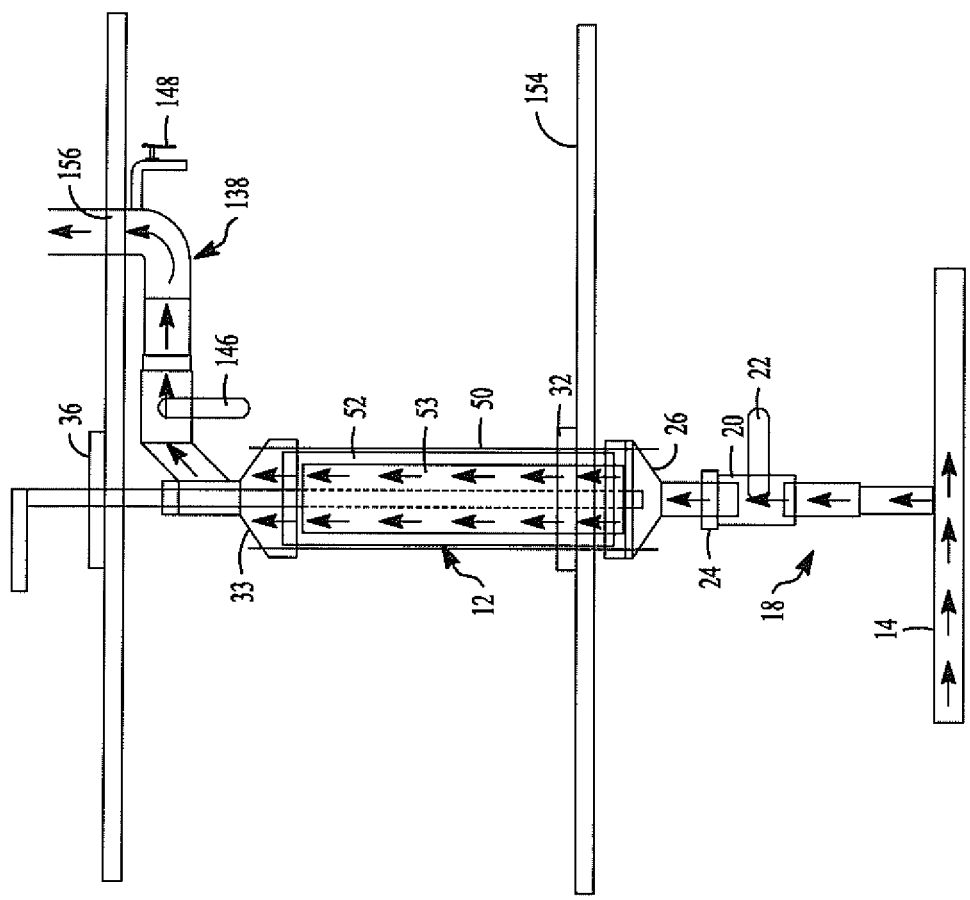
FIG. 6 is a detail cross section of an embodiment of a water treatment remediation device according to the present disclosure.

One non-limiting example of a fluid flow path is depicted in FIG. 6. The general direction of fluid transit is depicted by the arrows. Thus the material with the greatest contaminant load is introduced at the bottom of the reaction tube assembly 12 and brought into contact with the concentrically disposed negative and positive electrodes housed therein. Exposure of the water to electroactive charged material resident on electrodes such as outer electrode member 56 and inner electrode member 58 in their charged state induces an advanced linear electro floatation (ALEF) event that incorporates processes associated with electrocoagulation/ electro-floatation induced by the passing of electrical current through water and various elemental catalysts to effect the isolation and removal of target contaminants from the aqueous process stream.

Without being bound to any theory, it is believed that the process stream that is introduced into the reaction tube assembly 12 as disclosed herein are exposed to strong electric fields, currents and electrically induced oxidation and reduction reactions. Depending on the solution matrix, exposure of the process stream to the reactive environment in the reaction tube assembly(ies) 12 for an interval between 0.5 seconds and one hour or more depending on factors such as the nature and concentration of the chemical contaminant will result in the ultimate elimination of target contaminant from the process stream. Non-limiting examples of target contaminant include heavy metals, large and small molecule organic materials and compounds, biologically derived contaminants and the like.

As used herein the term "heavy metals" is defined as metals and metalloids with relatively high densities, atomic weights, and/or atomic numbers. Non-limiting examples of such heavy metals include iron, copper, tin silver, gold, platinum, magnesium, aluminum, titanium, gallium, thallium, hafnium, indium, ruthenium, cadmium, mercury, lead, zinc, beryllium, scandium, chromium, nickel, cobalt, molybdenum, arsenic, bismuth, selenium, germanium, indium, iridium, as well as compounds and complexes containing one or more of the foregoing. Such materials can be found in a variety of effluent streams including those produced by manufacturing industries, chemical industries and the like. It can be appreciated that a number of the forgoing are identified as toxic pollutants by governmental agencies, for example, the US Environmental Protection Agency. Metal contaminants so listed include materials and compounds containing compounds such as arsenic, beryllium, copper, cyanides, lead, nickel, selenium, silver, thallium, zinc. It is contemplated that the device and process disclosed herein can accomplish the removal of over 99 percent of heavy metals from the associated process stream.

"Large and small organic molecular contamination", as defined herein include but are not limited to materials classified as toxic by regulatory agencies such as the U.S. EPA. Non-limiting examples of such compounds are benzene and its derivatives, carbon tetrachloride, chlordane, chlorinated dichlorinated and polychlorinated hydrocarbons such as ethanes, ethers and alkyl ethers, chlorinated, dichlorinated, and polychlorinated materials such as naphthalene, chlorinated phenols, chloroform, ethyl benzene, haloethers, halomethanes, hexachlorinated dienes, naphthalene, isophorone, nitrophenols, nitrosamines, PBBs and PCBs polynuclear aromatic hydrocarbons, tetrachloroethylene, toluene, trichloroethylene, and vinyl chloride. It is contemplated that the device and process as disclosed herein can reduce one or more of the large and small molecular contaminants to levels below 1% and, in some instances, to levels below detection limits.

It is to be understood that various embodiments of the device as disclosed herein can be efficaciously employed to treat process effluent arising from a variety of sources. For example, effluent material produced in chroming operations can contain materials such as acid soluble copper, nickel, chrome, and cyanide. It has been found, quite unexpectedly that the method and device as disclosed herein can be employed effectively to reduce or eliminate such compounds. Other compounds that can be removed or reduced using the method and device as disclosed herein include but are not limited to total suspended solids, and various biological compounds.

It is also contemplated that the advanced linear electrofloatation method as disclosed herein produces an environment that is able to disrupt the cell wall or cell membrane of certain microorganisms present in the process water thereby reducing the bacterial load of the treated process water.

Without being bound to any theory, it is believed that the process and system disclosed herein also uses a combination of natural forces including, but not limited to: electrocoagulation (EC)/electro-floatation (EF), magnetism, vortex-induced vibration, frequency resonance, advanced fluid dynamics and certain aspects of scalar energy to achieve the most efficient and thorough treatment possible.

The device 10 as disclosed herein can also include suitable wiring and means for connecting to an external power source (not shown). It is also contemplated that the device 10 can be equipped with suitable on-board power source options including but not limited to generators, battery packs, fuel cells, solar cells and the like. In many applications, hydrogen will be generated as a byproduct of the linear electrofloatation process. In various embodiments, the device 10 can include suitable conduits for collecting the hydrogen by-product and replenishing hydrogen cells and the like.

Without being bound to any theory, it is believed that the device 10 as disclosed herein provides an environment in the reaction tube assembly that neutralizes ion and particle charges present on at least a portion of the chemical contaminants present in the process stream that causes the contaminants to precipitate. The system disclosed herein can precipitate charged colloids and remove significant amounts of other ions, colloids, and emulsions. In certain applications, it is believed that reductions in contaminant concentration can be accomplished that reduces the contaminated water volume for discharge between 50% and 90%.

As used herein, the term "vortex frequency resonance" is defined as the combination of vortices, magnetism and the ability to program beneficial frequency patterns into water. Without being bound to any theory, it is believed that exposure to the environment present in the activated reaction tube assembly permits the water molecules to orient in a more natural crystalline structure. It is also believed that altering the frequency environment of the process water reduces the presence of unhealthy bacteria, insects and algae.

Figure 9:
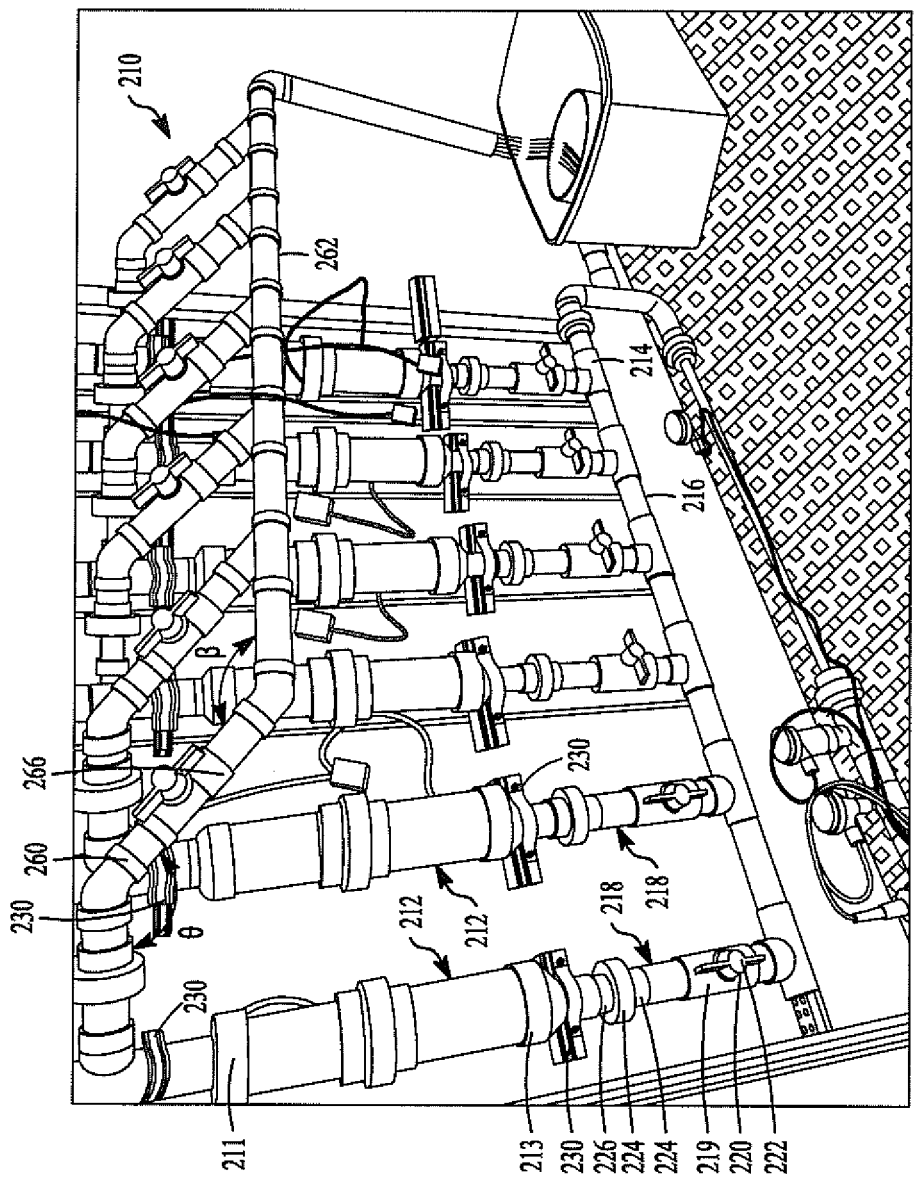
FIG. 9 is a perspective view of a second embodiment of the water remediation device stack as disclosed herein.

An alternate embodiment of the device 210 as disclosed herein is depicted in FIG. 9 and includes an inlet assembly 214 that can include a main inlet pipe 216 to which one or more of the reaction tube assemblies 212 are operatively connected. The one or more reaction tube assemblies 212 can be connected to the main inlet pipe 216 by any suitable means. The main inlet pipe 216 is configured to convey aqueous effluent or other process material to be treated from a source or sources into one or more reaction tube assemblies 212 that are present and on line in the device 210. The device 210 will include suitable means for directing the effluent process stream through one or more reaction tube assemblies 212 in either a series or parallel process as desired or required for specific treatment parameters.

In the embodiment depicted in the various drawing figures, the inlet directing means can include a suitable reaction tube inlet 218. In the embodiment as depicted, a given reaction inlet 218 will be coupled to each respective reaction tube assembly 212. It is also within the purview of the present disclosure that multiple reaction tube assemblies 212 can be associated with a specific reaction inlet 218 in certain embodiments if desired or required.

The respective tube assemblies 212 are generally elongated cylindrical members having a first end region 211 and an opposed second end region 213. In the use position, the first end region 211 is oriented above the second end region 213.

The reaction inlet assembly(ies) 218 are in fluid contact with the main inlet pipe 16. The reaction tube inlet assembly (ies) 218 each can be configured with means for isolating the associated reaction tube 212 from the process stream for an interval or intervals. In the embodiment as illustrated, each reaction tube inlet assembly 218 has an inlet pipe 219 configured with a suitable inlet valve 220 that is moveable between an open and closed position. Where desired or required, the inlet valve 220 is ball valve assembly can include a suitable actuator such as handle 222 for manual implementation between the open and closed positions. It is also contemplated that the inlet valve 220 in the inlet valve assembly 218 can be electronically actuated, if desired or required. In certain embodiments, the second end of at least two reaction tube assemblies 212 may be in fluid connection with one another.

The reaction inlet assembly 218 can also be equipped with a suitable inlet quick disconnect member 224 that is located downstream of the inlet valve 220. In the embodiment depicted in FIG. 9 the quick disconnect member can be a configured as a rotatable sleeve that engageable with a suitably configured mating member. The quick disconnect member can matingly engage a suitable mating quick disconnect member 226 associated with the respective reaction tube assembly 212 to facilitate the ready removal and replacement of one or more reaction tube assembly(ies) 212 as desired or required. In certain embodiments, it is contemplated that the inlet quick disconnect member 224 that is associated with the reaction inlet assembly 218 can be a female member configured to engage a corresponding male member associated with the associated reaction tube assembly 212 in a fluid tight matter.

It is contemplated that when the device 210 is in the use position, the reaction tube assembly(ies) 212 can be anchored to a suitable structure such as a side wall or the like. In the embodiment depicted in FIG. 9, the device 210 can include suitable anchor devices 230. The device 210 can have one or more anchor devices 230 associated with each reaction tube 212. In the embodiment depicted in FIG. 1, an anchor device is positioned in the general region of the at opposed ends 211, 213 of each respective reaction tube assembly 212.

In the embodiment depicted in FIG. 9, treated water exits the respective tube assemblies 212 into exit channels 260 which are oriented toward collection channel 262. The exit channels 260 can be configured with suitable valve closure members 264. When closed, the valve closure member 264 can serve to isolate the associated tube assembly 212 from the associated would be required to service and/or substitution.

In the embodiment as depicted in FIG. 9, exit channels 260 can be configured to direct treated process water downward from the exit point at end region 211 from the respective tube assembly 212 into a collection channel 262 that is located at a position below the exit point of the tube assembly 212. In the embodiment depicted, the collection channel 262 is positioned below the tube exit point at end region 211. The respective exit channels 260 are configured to include a central region 266 that is oriented at an angle to an associated initial portion 268 to define an angle θ that is between 95° and 120°. The exit channels 260 are configured such that the angle β defined between the central region 266 and the collection channel 262 is between 95° and 120°. In certain embodiments, the collection channel 262 can have a run that is 0.5 inches per foot and 4 inches per foot.

In certain embodiments, one or more of the reaction tube assemblies 12, 212 can include a central insert 300 that is positioned at a location generally centrally positioned in the reaction tube assembly 12, 212 between the inlet and the outlet. The central insert 300 can be positioned at a location suitable to induce spiral aqueous flow in the reaction tube assembly 12, 212.

Figure 10:
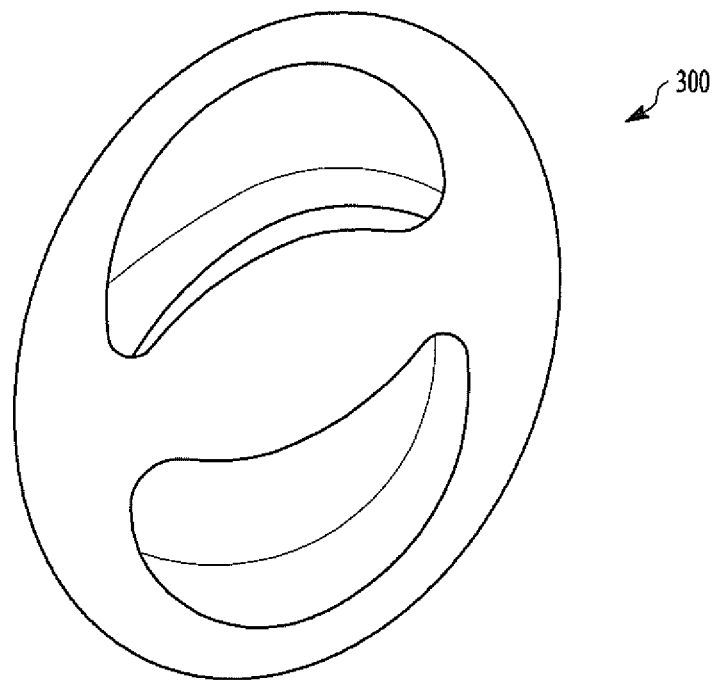
FIG. 10 is a cut away of detail of a second embodiment of the water remediation tube as disclosed herein with as a spiral insert.

A non-limiting example of fluid flow in a reaction tube assembly 12, 212 is depicted in FIG. 10. Water is channeled through a lower insert having generally straight channels inducing a generally linear flow that enters central insert 300. The water exiting the central insert 300 exhibits an induced spiral flow. Without being bound to any theory, it is believed that the spiral flow and associated increased turbulence increases contact time between the flowing water and the electrode surface.

Figure 11:
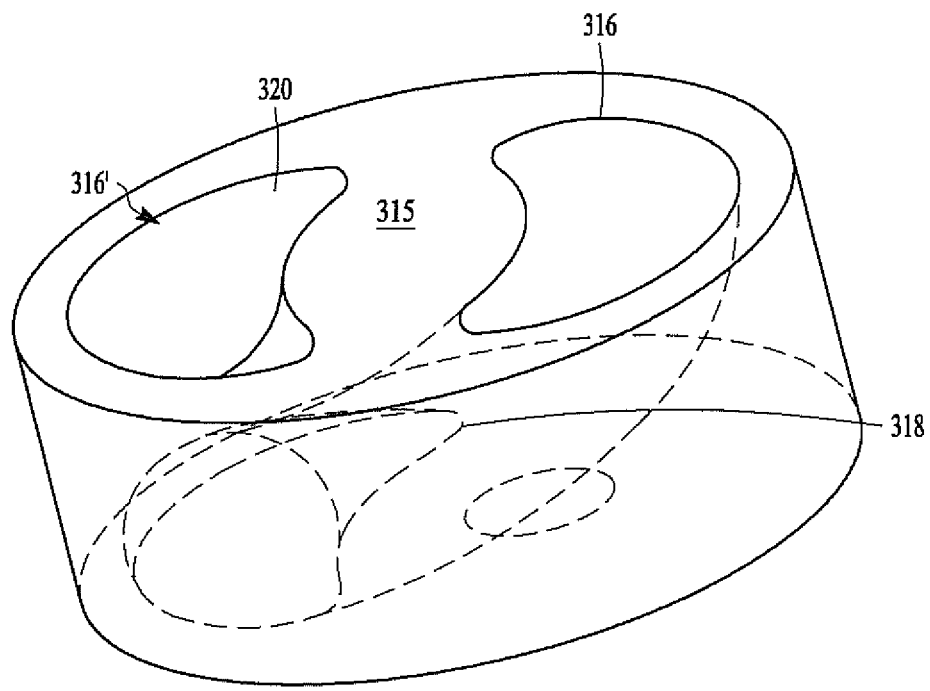
FIG. 11 is a perspective view of the spiral insert of FIG. 10.
Figure 12:
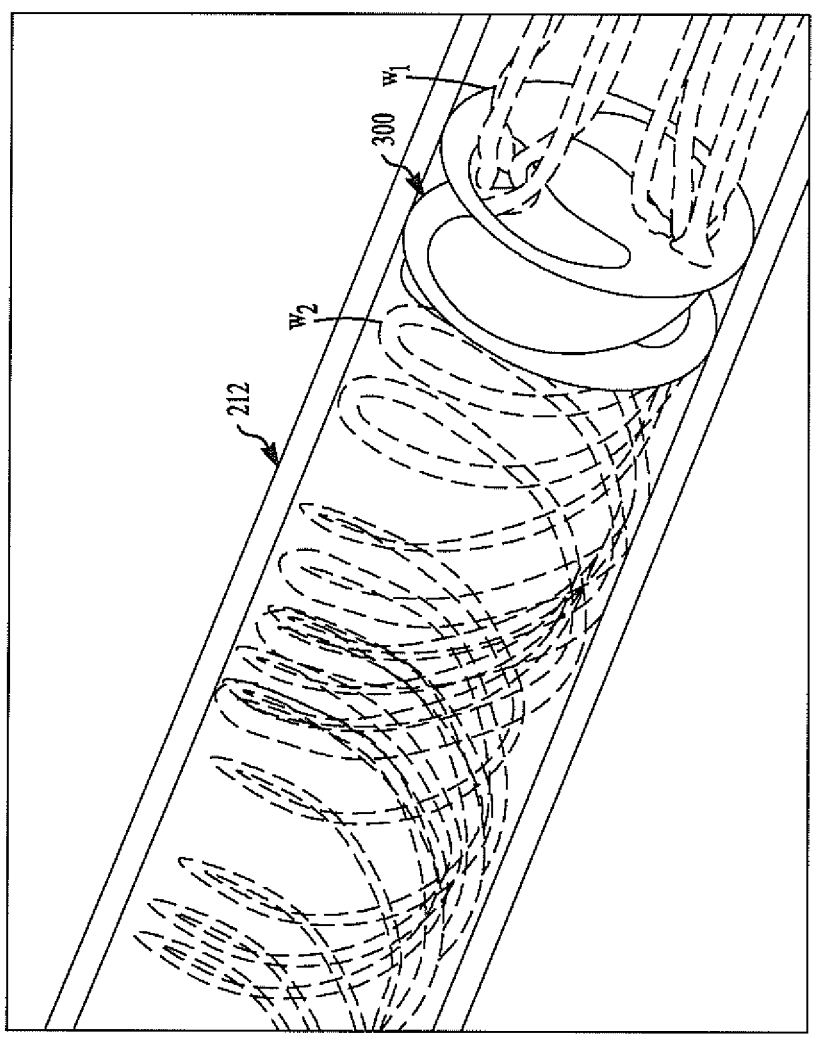
FIG. 12 is a perspective view of the spiral insert of FIG. 10 depicted the fluid channel(s) defined therein in phantom.

A non-limiting example of central insert 300 is illustrated in FIGS. 10, 11 and 12. The central insert 300 is configured to be positioned in the interior of the associated reaction tube assembly 12, 212 in an orientation perpendicular to the longitudinal axis of reaction tube assembly 12, 212 in a generally fluid tight manner.

The central insert 300 has a central body 310 with opposed planar faces 312, 314 and a peripheral side member 315 located therebetween. In the embodiment depicted in the FIGS. 11 and 12 the central insert 300 includes a pair of spiroid channels 316, 316' that transit the interior of the central body 310 at an orientation generally parallel to the peripheral side member 315. In certain embodiments, the exit 318 of the respective channel 316 is offset from between 15° and 180° from the entrance 320 to the channel 316, with offsets between 15° and 90° being employed in certain applications.

In certain alternate embodiments, the reaction tube assembly 12 can be configured with an alternate electrode assembly such as electrode assembly 400. As depicted in the embodiment in FIGS. 13 and 14, reaction tube assembly 12 can be mounted to a suitable support surface such as wall W by means of a suitable bracket 402 that is connected to the reaction tube assembly 12 at a position proximate exit assembly 404. Electrode assembly 400 can include a central rod 410 that is configured as a solid member and may be composed any suitable electro-conductive material. In certain embodiments, the central rod 410 can include central member 412 composed of an electro-conductive material such as a suitable steel alloy or the like. Where desired or required, the central member 412 can be configured as a cylindrical core and can have an electroactive electrode material layer 414 attached and overlying its outer surface.

A threaded electrode rod 416 can project outward from the upper surface 418 of the central rod 310 to form an electroconductive connection with the suitable electric current source such as the negative current power delivery service depicted in FIGS. 1 and 6.

Figure 17:
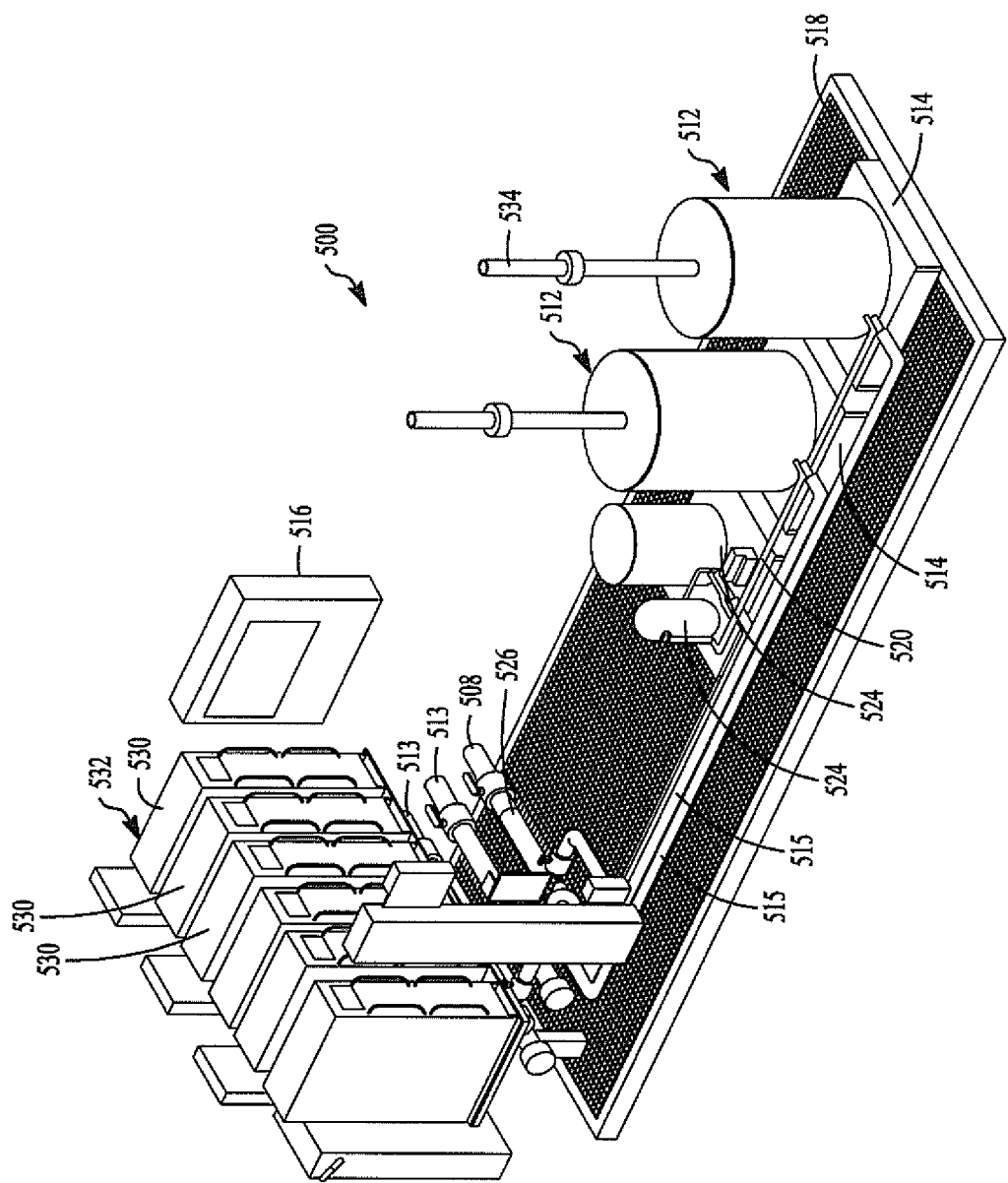
FIG. 17 is a perspective view of an embodiment of a mobile water remediation device as disclosed herein.
Figure 18:
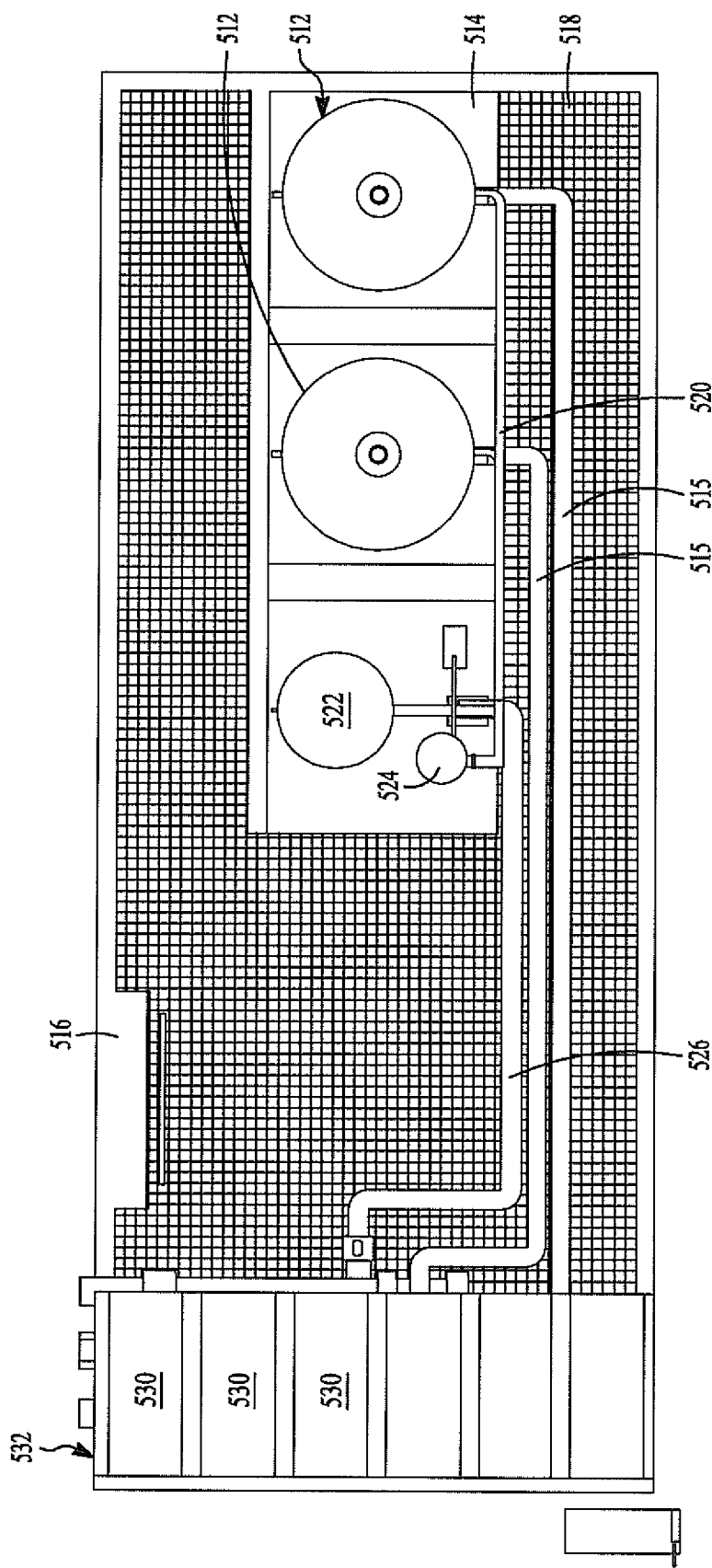
FIG. 18 is a top view of the mobile water remediation device as disclosed herein.
Figure 19:
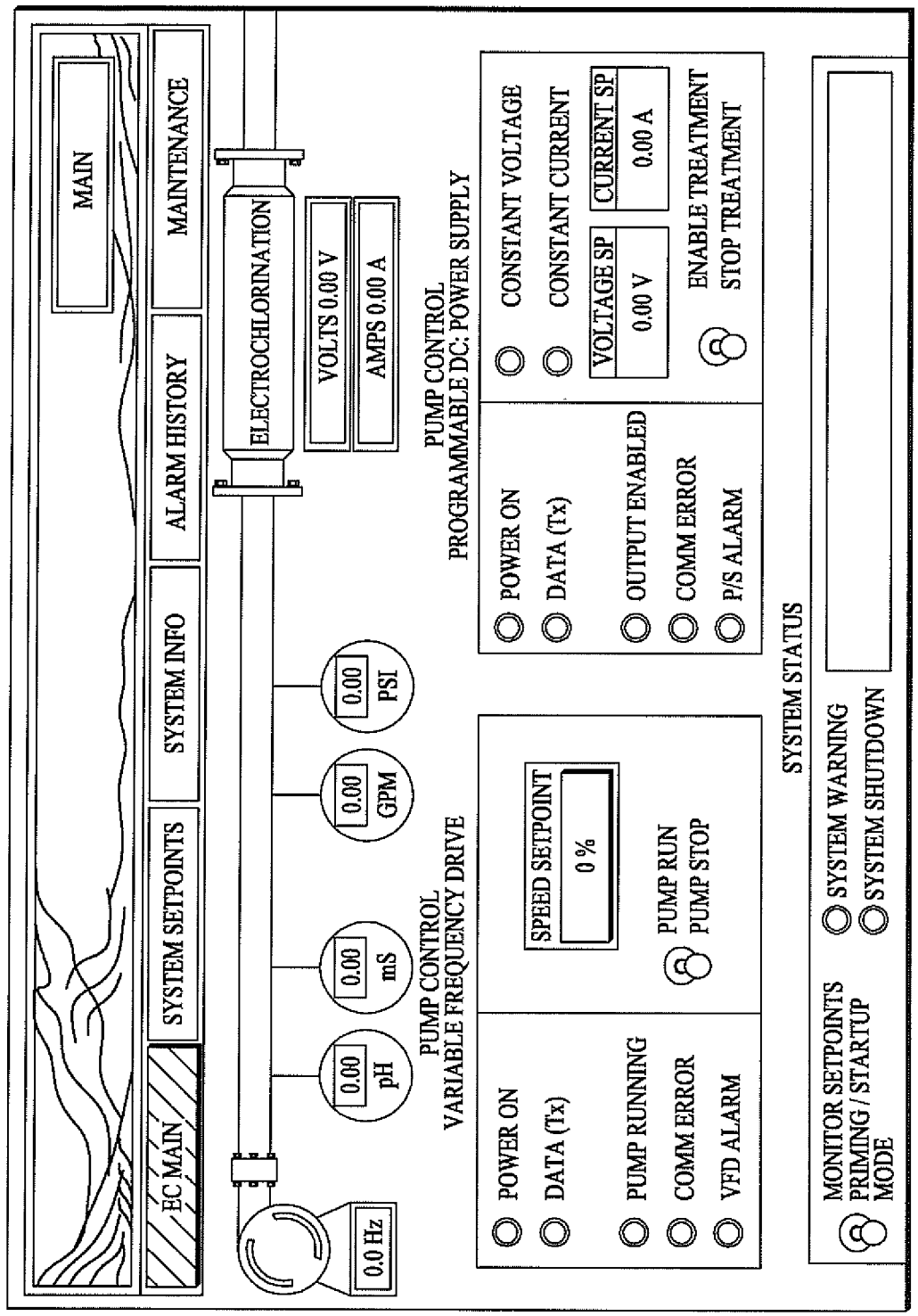
FIG. 19 is a screen capture of the user interface of an embodiment of the water remediation device as disclosed herein implementing and embodiment of the advanced linear electro-floatation method as disclosed herein at a main or launch point.
Figure 20:
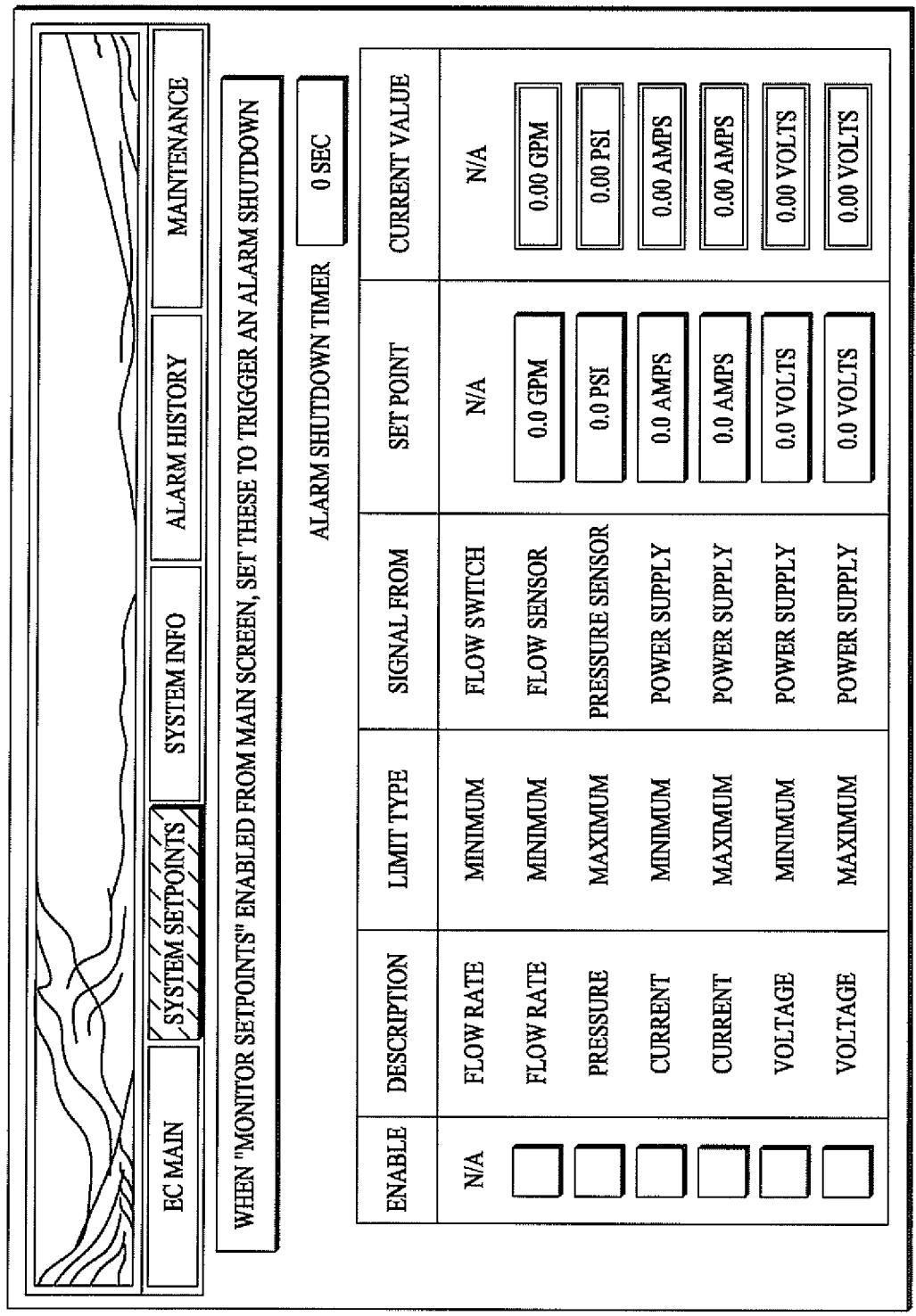
FIG. 20 is a screen capture of the user interface of an embodiment of a water treatment/remediation device as disclosed herein implementing an embodiment of the advanced linear electro-floatation method as disclosed herein outlining system setpoints.
Figure 21:
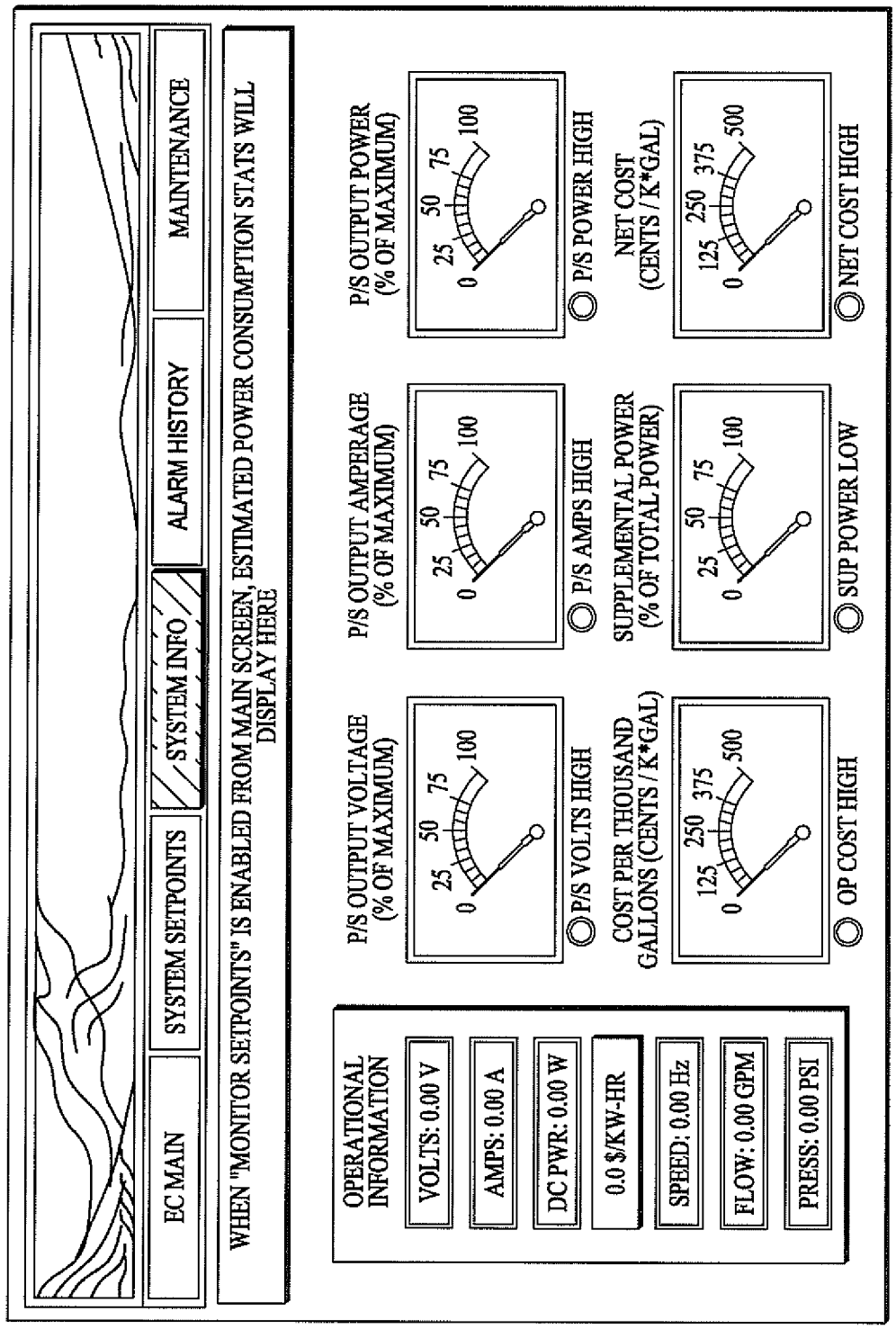
FIG. 21 is a screen capture of the user interface of an embodiment of a water treatment/remediation device as disclosed herein implementing an embodiment of the advanced linear electro-floatation method as disclosed herein outlining system information.
Figure 22:
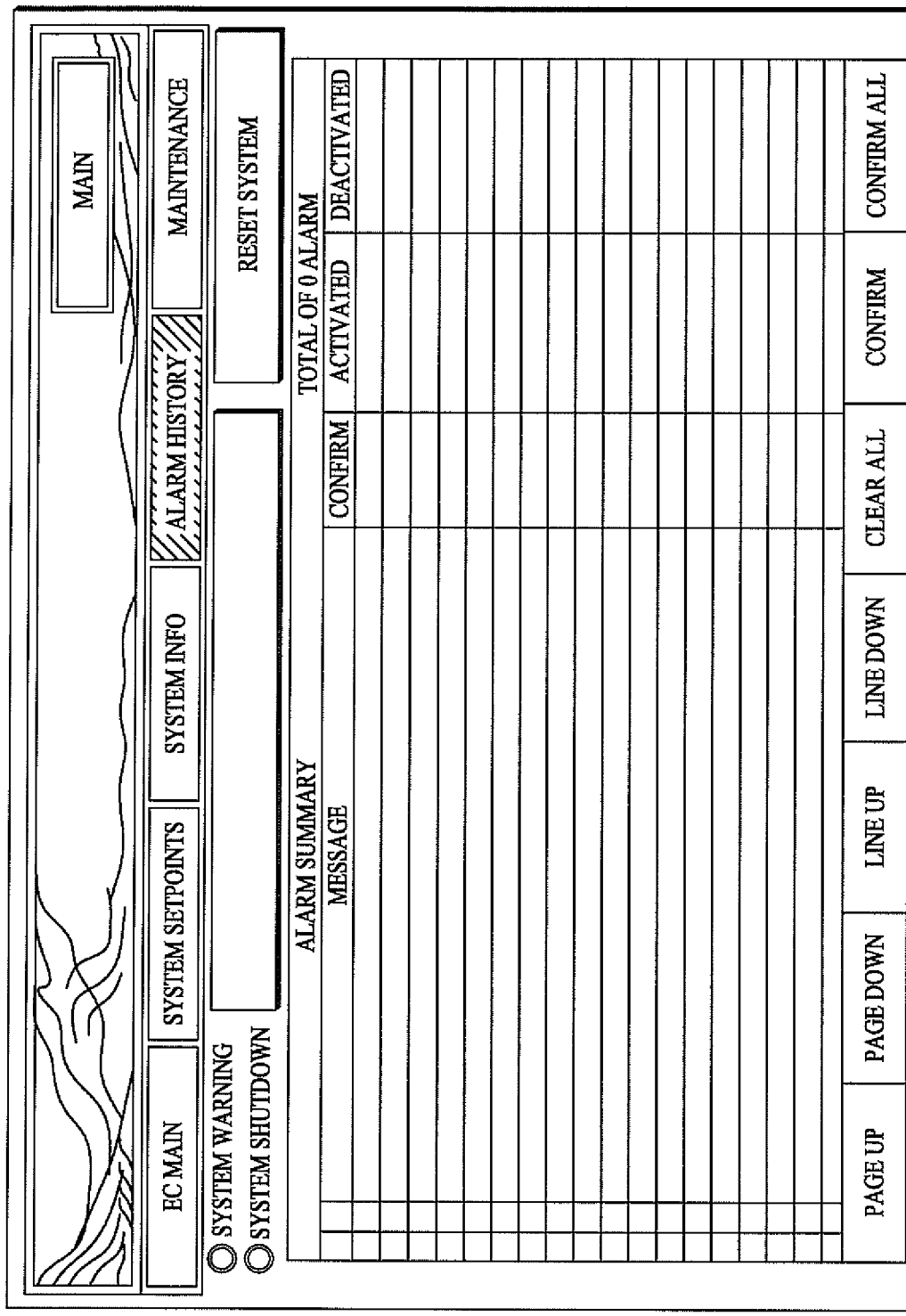
FIG. 22 is a screen capture of the user interface of an embodiment of a water treatment/remediation device as disclosed herein implementing an embodiment of the advanced linear electro-floatation method as disclosed herein outlining alarm history.
Figure 23:
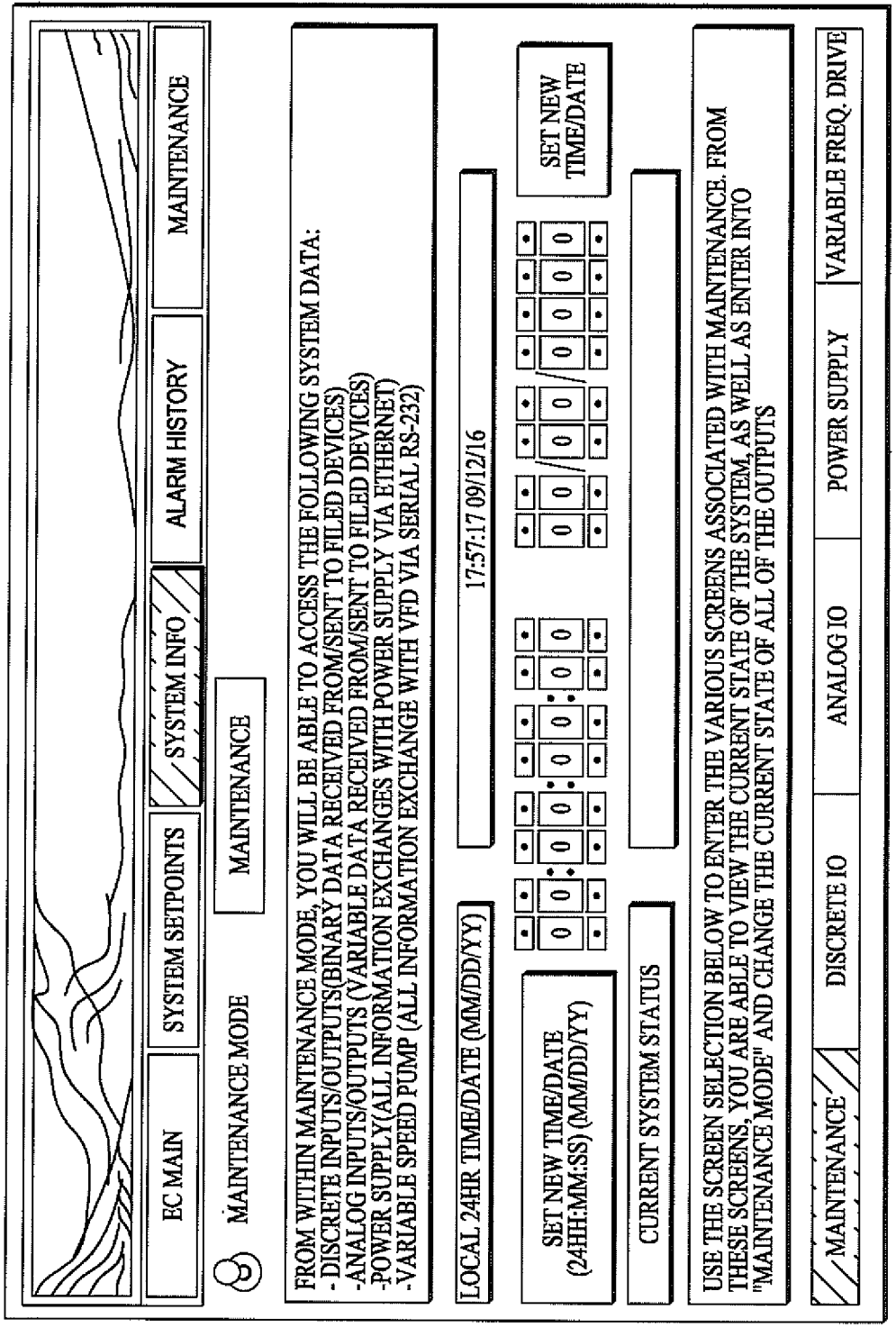
FIG. 23 is a screen capture of the user interface of an embodiment of a water treatment/remediation device as disclosed herein implementing an embodiment of the advanced linear electro-floatation method as disclosed herein outlining alarm maintenance information.
Figure 24:
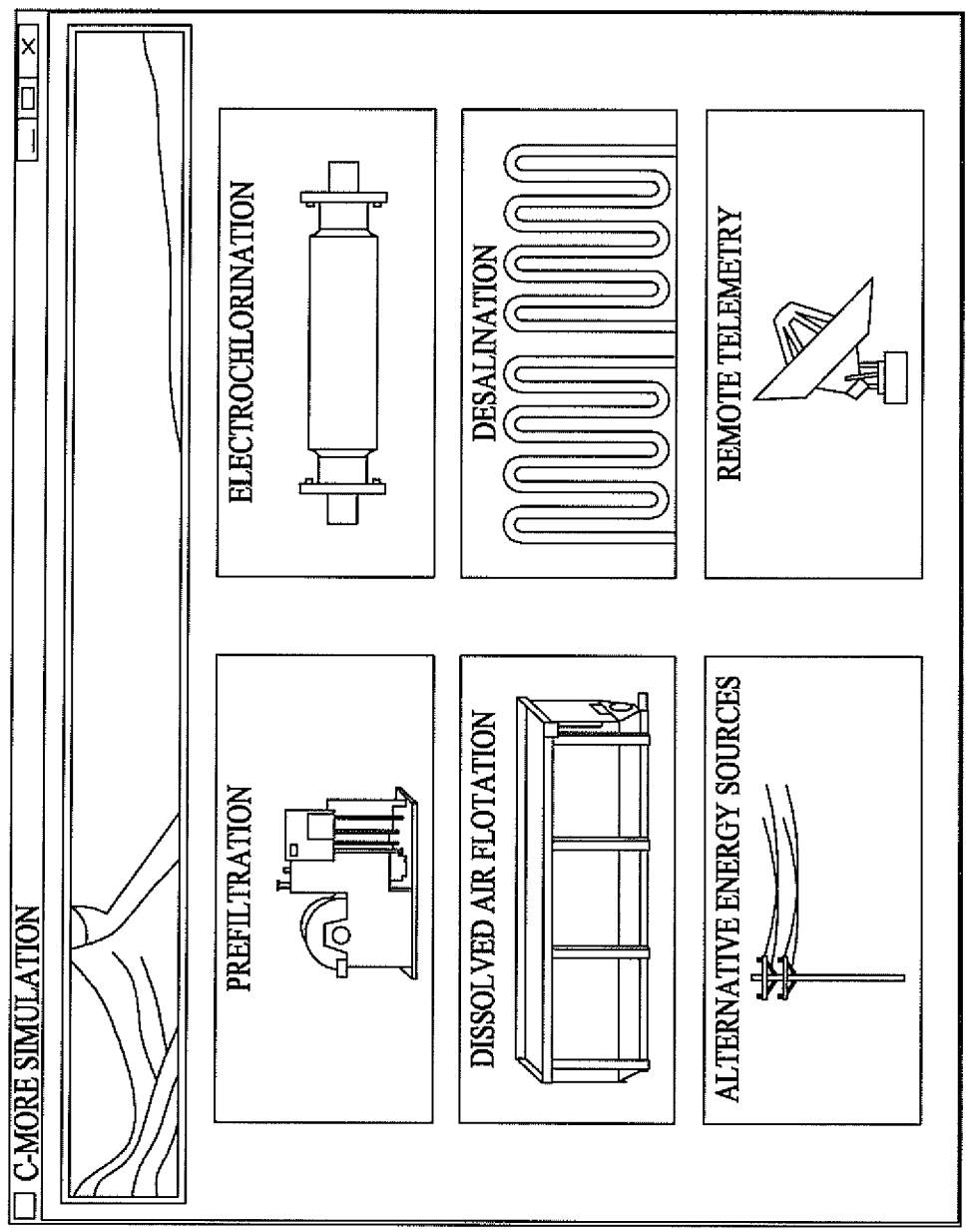
FIG. 24 is a screen capture of the user interface of an embodiment of a water treatment/remediation device as disclosed herein implementing an embodiment of the advanced linear electro-floatation method as disclosed providing interface with various processes.

It is contemplated that the water remediation device as disclosed herein can be incorporated into a water treatment unit 500, an embodiment of which is illustrated in FIGS. 17 and 18. The water treatment unit 500 broadly includes one or more reaction chambers 12 that are positioned and configured to be brought into fluid contact with a suitable process stream or water source. In the embodiment Illustrated in FIGS. 17 and 18, the water treatment unit 500 includes at least two elevated throughput reaction chambers assemblies 512. In certain embodiments, it is contemplated that each reaction chamber assembly can have a capacity between 1 and 50 gpm; with capacities between 2 and 10 gpm being contemplated in certain applications. The reactions chamber assemblies 512 will include on or more of the electrode systems as described herein.

Water treatment unit 500 is designed to control the remediation process, ie the advance linear electro-floatation process occurring in one or more of the reaction chamber assemblies 512 by allowing the user to control three treatment variables; the retention time or the flow rate of the process water to be treated, the current intensity (amps/cm2), and the selection of sacrificial and non-sacrificial electrodes. Two or more separately controlled reaction chambers, operating in parallel, are included in this water treatment unit 500. The reaction chamber assemblies 512 are easily accessible to allow the user to vary the anode and cathode material selection. In addition, the reaction chamber assemblies 512 can be disassembled and reassembled to modify the electrode configuration in each reaction chamber assemblies. The water treatment unit 500 can be configured with sufficient number of reaction chamber assemblies 512 to provide suitable treatment throughput. In the embodiment depicted in FIGS. 17 and 18, the reaction chamber assemblies 512 of water treatment unit 500 are configured to run in parallel. It is also within the purview of this disclosure to have one or more reaction chamber assemblies 512 configured to operate in series in order to target different chemical contaminants, etc.

The water treatment unit 500 is configured with a suitable process water intake 513 configured to connect to a process water source. Process water can be conveyed from the process water intake 513 through intake pipes 515 that are in fluid communication with the respective reaction chamber assembly 512.

It is contemplated the water treatment unit 500 can be configured with suitable pump(s) to maintain and augment process water flow through reaction chamber assemblies 512. In the embodiment as depicted, in FIGS. 17 and 18, the water treatment unit 500 is designed with two centrifugal pumps 514 each associated with a reaction chamber assembly 512 to provide fluid flow through the system. The centrifugal pump(s) 514 are in fluid communication with the respective intake pipes 515.

Figures 16A, 16B:
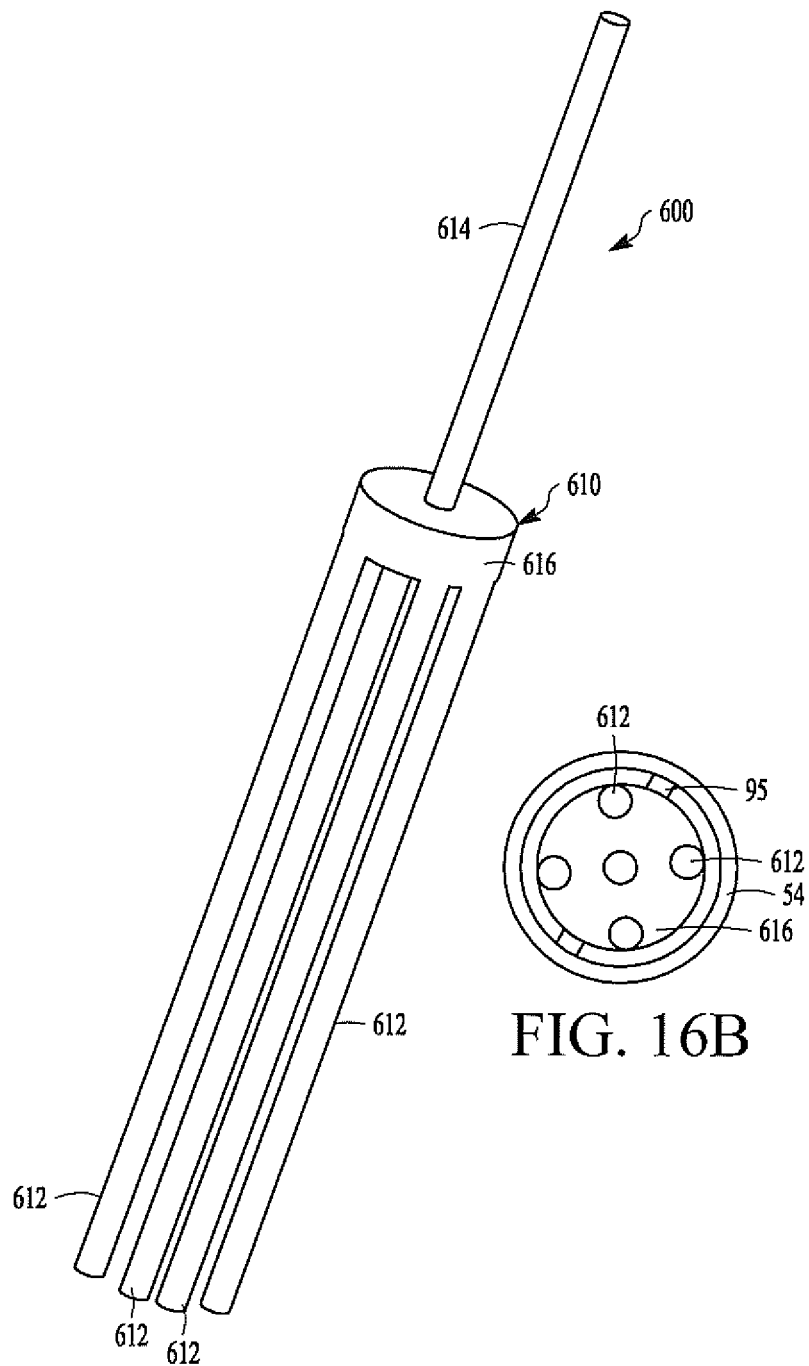
FIG. 16A is a perspective view of an alternate embodiment of an electrode for use in the reaction tube assembly as disclosed herein.

An alternate configuration of an electrode assembly is depicted in FIGS. 16A and 16B. Electrode 600 can function as either the cathode or the anode and can include an electrode body 610 with a central member 616 and a plurality of rods 612 extending therefrom. In the embodiment depicted the rods 612 are elongated cylindrical members that are radially disposed along the perimeter of the central member 616. The mating electrode is configured to project into a central region defined between the plurality of rods 612. The electrode 600 is rotatable relative to the outer housing 54 of the reaction tube assembly 12. Rotation can be accomplished by suitable action on the upwardly projection rod 614. Rotation of the electrode 600 relative to the outer housing of the reaction tube assembly 12 can bring at least a portion of the rods 612 into contact with elongated wiper projection 95 defined on the inner surface of the outer housing 54 to remove materials adhering thereto. It is contemplated that the rotation action can occur during electrode operation if desired or required. In such scenarios, the wiper member 95 will be constructed from a non-electro conductive material.

System operation is accomplished by using a consolidated control panel 516 that is in electronica communication with associated system components. The control panel 516 allows the operator to control and adjust key system variables quickly and with ease. System controls can be operated manually, automatically or a combination of the two depending on the configuration of the specific unit and/or the specific requirements of the user. It is also contemplated that the water treatment unit 500 can be configured to permit remote monitoring and operation of the unit or units. It is also contemplated that the water treatment unit can be configured such that adjustments can be made manually in real time, if desired, though a suitable user interface (not shown) or through direct manual operation on one or more manual adjustment mechanisms resident on the unit.

The water treatment unit 500 can be configured and mounted on a skid or other suitable base 518 as desired or required by the specific characteristics environment and application. it is also contemplated that the water treatment unit 500 can be mounted in the interior of a shipping container or other trailer unit (not shown). In the embodiment depicted, elements such as the intake pipes 515, and reaction chamber assemblies 512 can be placed in fixed attachment to a suitable structural element of the skid or base 518. It is contemplated that the water treatment unit 500 so configured can be brought to a location close to the process stream or other body of water that is to be treated. It can be appreciated that the water treatment unit 500 as disclosed herein can be used in a variety of industries including, but not limited to, oil and gas, agriculture, industrial waste streams, and many others.

Where desired or required, the reaction chamber assemblies 512, can be configured with electrodes as previously described. In certain embodiments, the electrodes can be configured to be self-cleaned and/or cleaned in place. It is contemplated that the cleaning process can be accomplished by rotational action of the respective electrodes as was previously described. It can also be facilitated by the action of the water turbulence itself as it progresses in spiral fashion through the reaction chamber assembly 512.

Thus it is contemplated that the reaction chamber assembly 512 can include one or more turbulence inducing devices located at or near the process fluid inlet to the reaction chamber assembly 512. Where desired or required, the turbulence inducing devices can cooperate with the location of the process fluid inlet to produce an upwardly oriented spiral path around the electrodes housed inside the reaction chamber assembly 512 for at least a portion of its residence time in the reaction chamber assembly 512. The turbulence inducing device may be configured with internal conduits in the manner described previously to produce the desired internal fluid flow patterns.

In the embodiment depicted in FIGS. 17 and 18, reaction chambers 512 are in fluid connection with a suitable outlet conduit 520. In certain embodiments, outlet conduit 520 can exit directly from the water treatment unit 500. In the embodiment depicted, the outlet conduit 520 can convey water from the reaction chamber assemblies 512 to suitable post treatment elements. Non-limiting examples of such post treatment elements include settling tank 522 and separator 524. In the embodiment depicted, the process stream exits the final post treatment element such as separator 524 and/or settling tank 522 into process stream outlet conduit 526 where it is conveyed to treated process stream outlet 528. Inlet 513 and process stream outlet 528 can be configured to connect to suitable external conduits and the like to permit the material to be conveyed to and from the water treatment unit 500. Where the water treatment unit 500 is configured in a transit container, it is contemplated that inlet 513 and process stream outlet 528 can extend through the associated container wall. In certain applications the through the wall junction will be one that is proximate to the base or floor of the associated container.

Wherein desired or required, the reaction chamber assembly 512 can include circular electrodes that are disposed in the reaction chamber assembly 512 in the manner described previously. The system can be operated manually or can be configured to respond to remote electronic commands. The electrodes can receive negative and positive current and deliver the current to the respective electrodes in the manner described previously. The water treatment unit 500 will include suitable means for delivering appropriate electrical supply to the electrodes for maintaining the advanced linear electro floatation process as well as powering any pumps, and ancillary devices. Such electrical delivery means includes various wires, cables and the like. The source of electric power can be an external source. Alternately, the source of electrical power can be one or more batteries 530 in the form of a battery array 532.

The battery array can be configured to be rechargeable by a variety of methods including but not limited to connection with an externally maintained power source, connection to on board solar cells (not shown) and hydrogenation from by-products of the advanced linear electro floatation process occurring in the water treatment unit 500. Where hydrogenation is employed, at least a portion of the hydrogen generated from the water treatment process can be conveyed through the flue member 534 exiting reaction chamber assembly 512 to a suitable hydrogen cell or the like.

It is also contemplated that the electrodes in the reaction chamber assembly 512 can be configured to self-clean in the manner and configuration previously outlined. It is also with in the purview of this disclosure that the electrodes to be cleaned can be exposed to one or more of a variety of wash solutions that can be introduced as circulated in the reaction chamber assembly 512. The type and composition of the wash solution can vary depending on the nature of the build-up and deposition on the electrode surface which can be dependent on the make-up of the process stream under treatment. Thus each reaction chamber assembly 512 includes appropriate vales and conduits to isolate the reaction chamber from process flow and receive wash solution as required.

In certain embodiments, the water treatment unit 500 will include a dedicated clean in place system. It is contemplated that the clean in place system is a manually controlled maintenance system designed to remove buildup that accumulates on the electrode plates. The clean in place system has the capability of using a variety of wash solutions depending on the water being treated. For advanced versions, the clean in place system can be operated automatically. The system disclosed herein can provide distinct variations for highly tuned water processing protocols, streamlined CAPEX and cost effective OPEX Variable parameters include but are not limited to Pump type—flow rate per reactor—active electrode plate—material plate spacing—polarity across plates—chemical treatment per reactor—series of parallel operation—electrical power configuration—current density—built in self—cleaning system—advanced touch screen control system with 4 level hierarchy role based access control.

In contrast to electrocoagulation systems that are bases on a single large reactor, in certain embodiments and applications, it is contemplated that the reaction chamber assemblies 512 are configured with multiple plates or electrodes that effectively convert the reaction chamber assembly into a plurality of smaller reaction chambers or zones. The resulting reaction chamber 512 is configured such that the number of plates that are activated as well as the relative spacing of the positive and negative plates from one another can be controlled. It is also contemplated that the reaction chamber assembly can be configured such that the current density and electrode polarity can be varied both between uses and during processing.

It has been discovered, quite unexpectedly that the device 10, 210 500 can be used to effectively address one or more of the following: variances in input water, continuous change in the plate electrical characteristics due phenomena such as buildup of materials on the plates/electrodes or deterioration/sacrifice of the plate/electrode material. It is also contemplated that the water treatment unit 500 as disclosed herein, addresses the need to clean and rejuvenate the electrode surfaces, as by the occasional back flush or reverse the polarity of the plates to refresh them. Thus the device as disclosed herein permits "on-the-fly" or automatic adjustment of one or more process-dependent parameters.

The electrodes or plates employed in the reaction chamber assembly 512 of the water treatment unit 500 are configured to receive and permit the electrical connection to be outside the reaction chamber and also to allow the selection of the plates on line and active at a given point in the cycle time to be adjusted physically relative to other electrodes as well as electrically via the current and amperage passing through the particular electrode plate. The electrode design such as that depicted in this disclosure mitigates against weakening and corrosion as well as the development of hot spots or arcing. It is contemplated that the unique electrode design as disclosed herein can provide and deliver a more consistent current density throughout the life of the reaction chamber assembly 512 as well as facilitating the turbulent fluid flow in order to prevent channeling.

It is also contemplated that different reaction chamber assemblies 512 can have different electrode configurations for different applications, but will typically use from six to thirteen plates depending on size of the reaction chamber and water chemistry. In certain applications, the various plates/rods can be oriented in a spiroid configuration concentrically disposed perpendicularly to the base 518. Depending on the properties of the water to be processed, the electrode plates may be composed of various metals metaloids, electroconductive materials and the like. In certain applications the electrodes can be all metal (Zn, Al, Fe), or a combination of metal and carbon. In the event that the reaction chamber has a combination of electrode plates, the chambers are designed to use the plastic electrode spacers in place of various electrode plates.

It is contemplated that process water treated by the method and device as disclosed herein can effect constituent removal of total suspended solids between 95 to 99%, biological oxygen demand reduction between 50 to 98% and reduction of entrained bacterial colonies 95 to 99% or greater in certain instances.

Among materials that can be effectively removed or reduced by the device and process as disclosed herein are contaminants produced in any and/or all of the following operations aluminum can manufacturing operations, arsenic steam cleaner operations, barium steam cleaner operations, calcium cooling tower descaling operations, electroplating and plating operations using materials such as cadmium, copper, iron, magnesium, and the like, chromium condenser washing operations, cobalt steam cleaner operations, acid mine drainage, lead manufacturing operations, munitions manufacture, mercury steam cleaner operations, molybdenum steam cleaner operations, nickel manufacturing, silicon acid mine materials, vanadium steam cleaner operations, zinc plating operations, food processing operations, municipal bacteria treatment operations Bacteria Municipal, publicly owned water treatment operations including sewage treatment, bacterial remediation, total suspended solids remediation, and the like.

It is also contemplated that the device and process can be employed in various aquaculture, agriculture and food processing operations to reduce BOD and COD from effluent streams and/or as a mechanism for water recycle and reuse.

It is contemplated that the device 10, 210 and water treatment unit 500 can generate oxygen and hydrogen byproducts. Oxygen generated can be fed back into the process stream to reoxygenate the water. As discussed previously, excess hydrogen can be made available for use as supplementary power utilizing a AC/DC buck-converter on a passive, separate hydrogen producing reactor chamber assembly having an MPPT control allows for adaptation between the PV generator and electrolysis. It also shows that the control of water flow injected in the electrolysis gives optimal hydrogen production. These two controls (MPPT and water flow) lead to optimal performances of the electrolysis system and therefore a maximize hydrogen production.

Water Electrolysis Principle for Hydrogen Production in Brief—

Electrolysis of water is the decomposition of its molecule into hydrogen and oxygen. A potential is applied across the electro chemical cell to cause electro-chemical reactions at the two electrodes. The main part of the PEM water electrolysis is the membrane electrode assembly (MEA). A perfluorosulfonic acid polymer such as nation is used as a membrane for water electrolysis in our passive hydrogen producing reactors. Due to its intrinsic properties, excellent chemical and mechanical stability and high proton conductivity is produced. Note: By "passive" reactor it is meant that such a reactor is not used for water treatment but solely to produce hydrogen and oxygen for further utilization. The anodic reaction that can occur on a variety of anode materials is as follows:

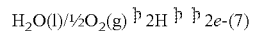

Under an electric field, the protons are entrained through the PEM membrane to the cathode where they combine with electrons coining from the external circuit to form hydrogen gas:

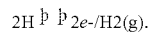

The hydrogen produced can be stored in multiple fuel cells and used for supplementary power, which dramatically lowers the cost of treatment and further allows for treatment in locations where the electric grid is not as established as in the industrial countries.

It is contemplated that the units disclosed herein can process between 0.5 gallons per minute and 600,000 gallons per day of process water effluent and can demonstrate one or more of the following system capabilities: removal of heavy metals as oxides that pass toxicity characteristic leaching procedure (TCLP); removal of suspended and colloidal solids; breaking oil emulsions in water; removal of fats, oil, and grease; removal of complex organics; destruction and removal of bacteria, viruses & cysts; removal of dangerous phosphates; removal of radioactive isotopes; ability to process multiple contaminants in the reaction chamber; accomplishes separation and recycling of drilling and production water and chemicals in industries such as oil and gas production. It is believed that the method and device as disclosed herein will have applications in industries such as oil and gas, aquaculture, remediation of large bodies of water, ground water clean-up and remediation, textile processing and dye manufacturing industries, commercial farming and poultry industries, process rinse and wash water generation—both commercial and residential, mining, sewage treatment, treatment of nuclear cooling tower water, radioactive isotope removal, metal recovery, influent water quality control, pretreatment for reverse osmosis, ultrafiltration, nanofiltration, photocatylitics, and the like, treatment of industrial wastewater, and the like.

It is believed that the method and device as disclosed herein can provide one or more of the following benefits: lower capital cost outlays compared with other water treatment technologies; smaller operational foot print; lower operating costs; low power requirements; low maintenance; requires limited operator attention and repair; generally requires no chemical additions; handles a variety of chemicals; produces minimal sludge; can treat multiple contaminants concurrently; and can handle wide variations in contaminant loading. Because the process and associated device as disclosed herein precipitate out large quantities of contaminants in one operation, the technology is the distinct economic and environmental choice for industrial, commercial and municipal water treatment. The capital and operating costs are usually significantly less than chemical coagulation. It is not unusual to recover capital costs in less than one year.

In order to better understand the invention disclosed herein, the following examples are presented. The examples are to be considered illustrative and are not to be viewed as limiting the scope of the present disclosure or claimed subject matter.

Example I

For example, a 5 GPM system constructed according to the embodiments depicted in FIGS. 9 and 17 was modeled and theoretical was compared to the theoretic performance of a typical chemical coagulation system. The systems were modeled to achieve the following process stream targets: at a process flow rate of 5 gallons per minute (GPM) (for 1,500,000 gallons per year).

Nickel reduction from 8.74 mg/L to a theoretical level <3 mg/L

Zinc reduction from 28.0 mg/L to a theoretical level <3 mg/L

Total suspended solids (TSS) reduction from 657 mg/L to a theoretical level <350 mg/L Oil and grease reduction from 27 mg/L to a theoretical level <15 mg/L Phosphorous reduction from 158.7 mg/L 5 to a theoretical level <10 mg/L The operating costs per gallon for chemical coagulation would be $0.03 per gallon which annualizes to a cost of $45,000.00. The operating costs for the linear electrofloatation system as disclosed herein is $0.001 per gallon which annualizes to a cost of $1,500.00 per year. Thus the estimated yearly savings using the system of FIG. 9, is $43,500.00 per year per 1000 gallons exclusive of labor, sludge transportation or disposal costs. It has not been determined whether such reductions are obtainable with chemical coagulation.

Example II

A second cost estimate modeling analysis for the system embodiments depicted in FIGS. 9 and 17 and chemical coagulation systems was conducted for a production flow rate of gallons per minute and an annual flow rate of 30,000,000 gallons per year achieving reductions in nickel contamination from 25 mg/L to <3 mg/L and chromium from 210 mg/L to <2 mg/L. The estimated operating cost for chemical coagulation systems was $14.18 per 1000 gallons for chemical coagulation systems and $1.69 for the system described herein for an annualized estimated operating cost of $425,400.00 for chemical coagulation systems and $50,700.00 for the system described herein exclusive of labor transportation and disposal costs. It has not been determined whether such reductions are obtainable with chemical coagulation.

This disparity was further analyzed. It is believed that the cost disparity is due at least on part to the nature of the chemical coagulation and precipitation process which, in waste water treatment, involves the addition of chemicals to alter the physical state of dissolved and suspended solids and to facilitate their removal by sedimentation. The chemicals used in wastewater treatment include materials such as alum, ferric chloride, ferric sulfate, ferrous sulfate, and lime. One inherent disadvantage to such coagulation/precipitation processes is that that they are additive; relying on the addition to material to achieve the desired precipitation reactions. In contrast the present system is directed to electroprecipitation processes which target dissolved and suspended solids and can achieve a reduction of total dissolved solids present in liquid of up to 90% in various situations. In certain applications, this processed water can be reused in situ rather than discharged providing an additional cost advantage.

Example II

Three 100,000 gallon portions of waste water is processed; one portion through the system described and illustrated in FIG. 9, one portion through a commercially available chemical coagulation system and one through a sedimentation system. Reduction in total dissolved solids (TSS) biological oxygen demand, (BOD) and bacterial load (undifferentiated) is ascertained for each portion. The percent reductions are outlined in Table I.

TABLE I

REDUCTION IN PERCENTAGE OF TARGET COMPONENTS

| Constituent | Advanced linear electro-floatation | Chemical precipitation | Sedimentation |
| --- | --- | --- | --- |
| TSS | 95 to 99% | 80 to 90% | 50 to 70% |
| BOD | 70 to 98% | 50 to 80% | 25 to 40% |
| Bacteria | 95 to 99.99% | 80 to 90% | 25 to 75% |

The handling and disposal of the sludge resulting from chemical precipitation is one of the greatest difficulties associated with chemical treatment. Sludge is produced in large volume from most chemical precipitation operations, often reaching 0.5 percent of the volume of wastewater treated when lime is used. It is estimated that the maximum removal of TSS without chemical addition is less than 70% in most instances. Addition of chemicals such as ferrous sulfate and lime, TSS removal rates may climb up to 85%.

It can be appreciated that the process and device as disclosed herein achieves TSS reduction above those benchmarks.

Example III

Figure 13:
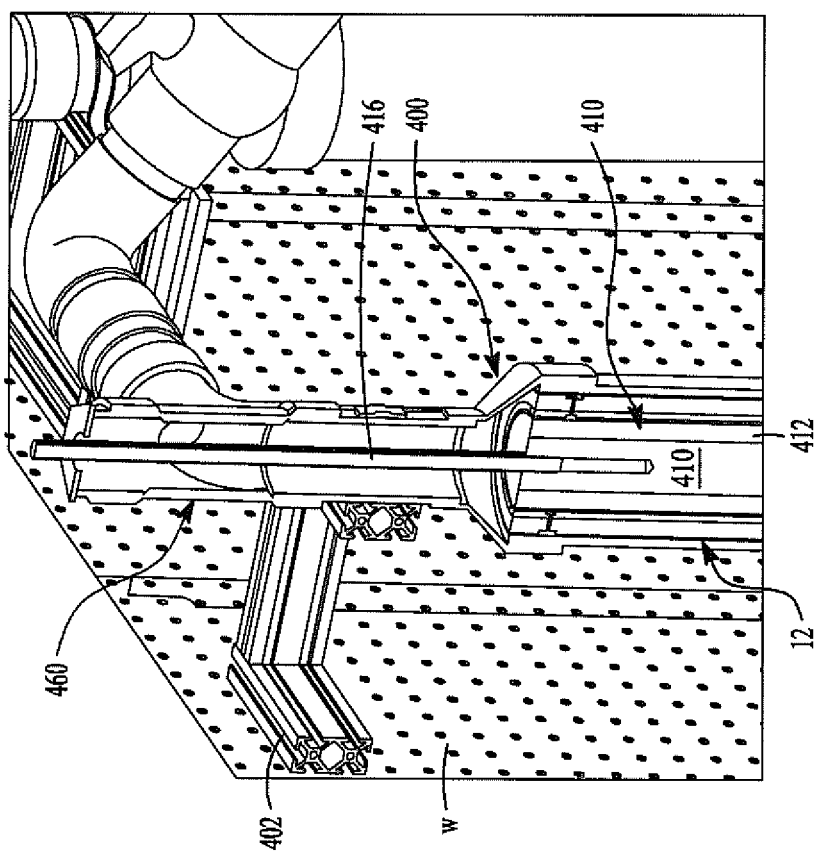
FIG. 13 is a detail cross-sectional view of the water remediation tube of FIG. 10.
Figure 14:
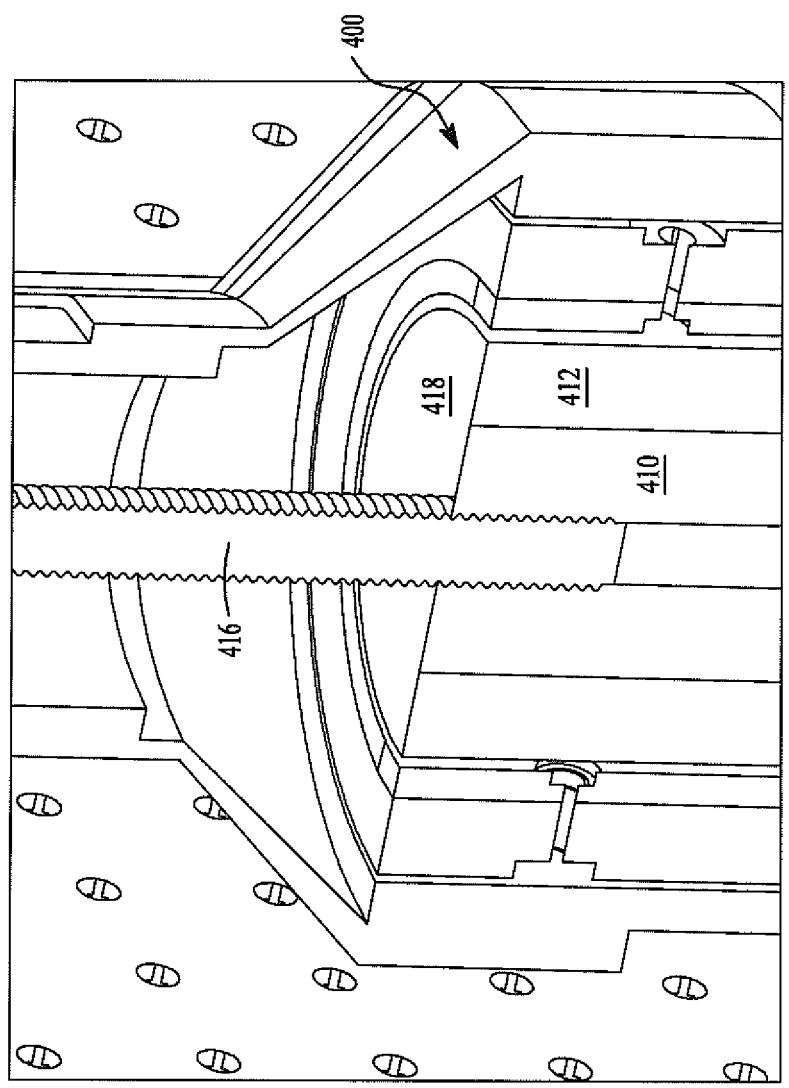
FIG. 14 is a detail of the upper reactor region of FIG. 13.

The device as described in FIG. 9 with the electrode structure as defined in FIG. 13 is employed using an electrical current delivered to the device of up to 480 v, centrifugal pumps rated at 150 GPM and six reaction tube assembly units on line in parallel each having electrode having a linear length of 3.5 feet and a reactor circumference of between 10 and 15 inches. The electrodes are composed of steel supported carbon (cathode) and iron electrode (anode) is employed to treat a process water flow of 1.0 Mgal/day. The process water has an initial suspended solids content of 220 mg/. The total sludge generated will be less than 0.5% of the material or approximately 285 cubic feet per day with a removal effectiveness of 99% of the TSS Comparisons to chemical precipitation processes employing 70 lbs. ferrous sulfate and 600 lbs. calcium carbonate will generate 600 cubic feet of sludge per day for a removal effectiveness of 85%. Comparison to TSS removal without chemical coagulation will yield about 60% removal effectiveness.

Sludge disposal costs are significant. A Class II landfill in Northern California only disposes of or treats non-hazardous waste. The landfill charges—$18.00 yard tipping fees for Class III and fill, non-leachable solids in the 20% moisture range. Non-hazardous waste recyclers can charge processing fees from $0.45-$3.00 per gallon, depending on solids and/or hydrocarbon content. Hazardous waste tipping fees for F listed sludge can range from $400 to $600 per yard.

Hauling charges are significant and may be more than the tipping fee. Hauling charges range can range from $55 to $70 per hour for short runs and $2.20 to $2.50 per loaded mile for runs over 100 miles for a 3,500 to 7,000 gallon (10 to 20 yard) truck. In addition, there can be miscellaneous charges such as truck washing fees and the like.

Example IV

A 1000 gallon portion of municipal sewage is treated using the device disclosed herein in the manner outlined in the Example III. The results are summarized in Table II.

TABLE II

| Constituent | Raw | Treated | % Removal |
|---|---|---|---|
| BOD (mg/L) | 1,050 | 14 | 99% |
| TSS (mg/L) | 4,620 | 7 | 99% |
| Bateria (cfu) | 110,000,000 | 2,700 | 99% |

The solids sludge material produced has a pH between 6 and 7 thus the metals in the sludge at this pH range are stabilized in a non hazardous form as oxides that will likely pass the U.S. Environmental Protection Agency (EPA) Toxic Classification Leaching Procedure (TCLP) and California Title 22 STLC & TTLC leach tests.

Example V

A 10,000 gallon sample of municipally derived waste water is treated by the process and device outlined in Example III after determining the initial concentrations of specific contaminants. Processed material is analyzed and the results are summarized in Table III.

TABLE III

| | Concentration (mg/L) | | Percentage of |
|---|---|---|---|
| Specific Contaminant | RAW | TREATED | Removal |
| Adenosine Tri Phosphate | 836.17 | 0.63 | 99.9 |
| Pg/L | 6279.47 | 7.15 | 99.9 |
| Acid Producing Bacteria (cfu/mL) | 9000 | <100 | 98.9 |
| | 800,000 | <100 | >99.9 |
| Sulfur Reducing Bacteria (cfu/mL) | 700,000 | <200 | 99.97 |
| | >6,800,000 | <200 | 99.9997 |
| Heterotrophic Plate Count (cfu/mL) | 4,140,000 | 3800 | 99.9 |
| E. Coli (mpn/100 mL) | 1,553,100 | 2599 | 99.83 |
| Biochemical Oxygen Demand (BOD) | 5,700 | 590 | 89 |
| | 1,740 | 330 | 81 |
| | 2010 | 300 | 85 |
| | 1280 | 338 | 73 |
| | | | 69 |
| Chemical Oxygen Demand | 25,500 | 1566 | 93.86 |
| | 3780 | 306 | 92 |
| Oil and Grease | 19,350,278 | 1,340 < 5 | 93 > 98.20 |
| Total Dissolved Solids | 54,800 | 19,400 | 68.1 |
| | 195,787 | 97,435 | 49.6 |
| | 126,814 | 20,166 | 84.1 |
| Total Extractable Hydrocarbons (ppm) | 307 | 8 | 97.4 |
| Total VolaAle Hydrocarbons (ppm) | 125 | <5 | >96.0 |
| Total Organic Carbon (TOC) | 6,400 | 250 | 96 |
| | 2,253 | 30.1 | 98.6 |
| Total Suspended Solids (TSS) | 1550 | <5 | >99.7 |
| | 1677 | <5 | >99.7 |
| | 805 | <5 | >99.4 |
| | 88,900 | 1,420 | 98 |
| | 2830 | 11 | 99.6 |

Example V

A 10,000 gallon sample of industrially derived waste water is treated by the process and device outlined in Example III after determining the initial concentrations of specific contaminants. Processed material is analyzed and the results are summarized in Table IV.

TABLE IV

| Specific Contaminant | Concentration (mg/L) RAW | Concentration (mg/L) TREATED | Percentage of Removal |
|---|---|---|---|
| Aluminum | 317 | 53 | 83 |
| | 0.0058 | 0.0023 | 60.3 |
| | 3.14 | 0.874 | 72.2 |
| Ammonium, as N | 52.6 | 22.8 | 56.6 |
| Arsenic | 0.4956 | 0.0288 | 94.2 |
| | 0.389 | 0.0084 | 97.8 |
| Barium | 6.12 | 0.1232 | 94.2 |
| | 129 | 5.38 | 97.8 |
| Boron | 6.69 | 1.4 | 88.2 |
| | 10.80 | 3.70 | 67.22 |
| Bromide | 474.83 | 311.17 | 34.47 |
| Calcium | 1321 | 21.4 | 98 |
| | 18,700 | 12,000 | 35.8 |
| | 79.1 | 4.06 | 94.9 |
| Cadmium | 31 | 0.338 | |
| | 3 | <0.005 | 99 |
| | 0.0046 | 0.0015 | >99.8 |
| | 0.168 | 0.147 | |
| Chromium, Total | 169 | <0.05 | >99.9 |
| | 0.0335 | 0.0173 | 48.36 |
| | 1.02 | <0.02 | >98 |
| Cobalt | 0.00120 | 0.00005 | 95.84 |
| | 0.0008 | <0.0002 | >75 |
| Copper | 287 | 0.484 | 99.8 |
| | 0.4772 | 0.0883 | 81.5 |
| | 0.897 | <0.500 | >44.3 |
| Iron | 241 | <1.00 | |
| | 151.637 | <0.005 | |
| | 35.676 | 0.023 | |
| Lead | 0.0390 | 0.0029 | |

TABLE IV-continued

| Specific Contaminant | Concentration (mg/L) RAW | Concentration (mg/L) TREATED | Percentage of Removal |
|---|---|---|---|
| | 0.258 | <0.06 | |
| Magnesium | 139 | 70.4 | |
| | 966 | 594 | |
| | 4.85 | 1.28 | |
| Manganese | 3.37 | 0.56 | |
| | 3.120 | 1.35 | |
| | 4.09 | 2.92 | |
| | 0.035 | <0.01 | |
| Mercury | 0.0015 | <0.0008 | |
| Molybdenum | 1.7 | 0.98 | |
| Nickel | 128 | 0.678 | |

TABLE IV-continued

| Specific Contaminant | Concentration (mg/L) RAW | Concentration (mg/L) TREATED | Percentage of Removal |
|---|---|---|---|
| | 0.329 | 0.214 | |
| Selenium | 0.0706 | 0.0219 | |
| | 0.025 | 0.005 | |
| | 0.21 | 0.14 | |
| Silica | 21.7 | <0.1 | |
| | 33.400 | <1 | |
| | 11.2 | <0.3 | |
| Silver | 0.00912 | <0.00003 | |
| Stontium | 2.74 | 1.4 | |
| | 7.76 | 0.89 | |
| | 844 | 553 | |
| Thallium | 0.0012 | <0.0002 | |
| | 0.008 | <0.00003 | |
| Vanadium | 0.034 | <0.01 | |
| Zinc | 221 | 0.069 | |
| | 9.53 | 0.154 | |
| | 8.2 | <0.500 | |
| | 0.298 | <0..01 | |

Example VI

A 10,000 gallon sample of municipally derived waste water is treated by the process and device outlined in Example III after determining the initial concentrations of specific contaminants. Processed material is analyzed and the results are summarized in Table IV.

TABLE V

| TABLE V DESCRIPTION | UNIT | METHOD | MAX ALLOWABLE | BEFORE | AFTER | % CHANGE |
|---|---|---|---|---|---|---|
| PH | | SM 4500-H + B | 5 < pH < 9 | 7.9 | 6.6 | −16.45 |
| Conductivity | Us/cm | SM 2510B | <2500 | 51,000 | 21.8 | −99.95 |
| T.P.H. | mg/liter | EPA 1664 | <30 | 0.7 | 0 | −99.85 |
| S.T. | mg/liter | SM 2540C | <1700 | 41,100 | 27,700 | −32.60 |
| Nitrogen | mg/liter | SM 4500-NH3F | <20 | 0.79 | 0.96 | −21.51 |
| Phenols | mg/liter | SM5530D | <0.15 | 1.56 | 0.03 | −89.07 |
| Temperature | ° C. | | +3° C. | 25 | 25 | 0 |
| Chlorides | Mg/liter | SM 4500-CI-B | <2500 | 23,293 | 3.60 | −99.98 |
| TDS | | | | | 10.91 | |

Although embodiments have been described above with reference to the accompanying drawings, those of skill in the art will appreciate that variations and modifications may be made without departing from the scope thereof as defined by the appended claims.

What is claimed is:

1. A method for remediating water comprising the steps of:
   introducing an aqueous process stream into a water remediation and treatment device, the water remediation and treatment device comprising:
   a process channel having fluid inlet and a fluid outlet, the fluid inlet of the process channel configured to receive the aqueous process stream; and at least one reaction tube assembly in fluid communication with the process channel, the reaction tube assembly defining an interior chamber having an interior fluid flow path, at least one anode and at least one cathode contained in the interior chamber and positioned in the interior fluid flow path, wherein the at least one of the cathode or anode is configured as a cylindrical electrode member and wherein the other of the cathode or anode is positioned radially relative to the cylindrical electrode member, wherein each cylindrical electrode member further comprises a first end and an opposed second end, an inwardly oriented face and an outwardly oriented face and at least one longitudinal projection extending from the inwardly oriented face of the cylindrical electrode and extending from the first end of the cylindrical and wherein the cylindrical electrode member is axially moveable relative to the other electrode;

activating the at least one anode and the at least one cathode present in a reaction tube assembly;

maintaining the aqueous process stream in contact with the at least one activated cathode and the at least one activated anode for at least one interval sufficient to trigger linear electrofloatation of at least one target contaminant present in the aqueous process stream, and wherein the at least one cathode and the at least one anode are constructed from an electroactive material selected from the group consisting of carbon, graphite, iron, titanium, platinum, zinc, aluminum, ruthenium, and mixtures thereof; and cleaning at least one surface of the cylindrical electrode.

2. The method of claim 1 wherein the activated cathode and the activated anode are disposed with a gap between ⅛ inch and 1 inch between them, at least a portion of the aqueous process stream passing through the gap defined between the cathode and the anode and wherein the cathode and anode operate a power range between 10 amps and 350 amps and between 2 volts and 60 volts and wherein the aqueous process stream passes through the reaction tube assembly at a rate sufficient to facilitate linear electrofloatation.

3. The method of claim 2 further comprising the step of diverting at least one gaseous by-product of linear electrofloatation, wherein if the by-product is oxygen, the oxygen by-product is directed into the aqueous process stream downstream of the anode and cathode and wherein, if the by-product is hydrogen, directing at least a portion of the hydrogen to a hydrogen storage cell located remote to the reaction tube assembly.

4. The method of claim 2 wherein at least one of the gap, the power range and/or the aqueous stream process flow rate are variable based on user defined inputs.

5. A method for remediating water comprising the steps of:

activating at least one anode and at least one cathode present in at least one reaction tube assembly;

introducing an aqueous process stream into contact with at the least one activated cathode and the at least one activated anode; and maintaining the aqueous process stream in contact with the at least one activated cathode and the at least one activated anode for at least one interval sufficient to trigger linear electrofloatation of at least one target contaminant present in the aqueous process stream, wherein the cathode and the anode are elongated members each having a longitudinal axis and the aqueous process stream introduced into contact with at least one activated cathode and at least one activated anode and passes between the gap defined by the cathode and the anode at an angle oblique to the longitudinal axis of the anode and the cathode, and wherein the reaction tube assembly further comprises:
(a) an outer elongated housing having an inlet aperture and an outlet aperture defined therein opposed to the inlet aperture, the outer elongated housing defining an interior reaction chamber and further defining a fluid flow direction;
(b) a reaction tube inlet member operatively coupled to the inlet aperture defined in the reaction tube body and to the process channel;
(c) a reaction tube outlet member operatively coupled to the outlet aperture defined in the reaction tube body and to the process channel;
(d) the at least one anode positioned in the interior chamber, wherein the at least one cathode is positioned in the interior chamber, wherein the at least one anode and the at least one cathode are elongated and positioned parallel to the fluid flow direction.

6. The method of claim 5 wherein the at least one longitudinal projection is positioned on an inner surface of the outer elongated housing.

7. The method of claim 6 wherein the interior electrode member comprises at least two elongated convex members each having a first end and an opposed second end.

8. The method of claim 5 wherein the water remediation and treatment device further comprises at least two reaction tube assemblies positioned in parallel in the process channel.

9. The method of claim 5 wherein the at least one cathode and the at least one anode are positioned to define a gap between ⅛ inch and 1 inch between the respective operating surfaces.

10. The method of claim 9 wherein the at least one cathode and the at least one anode are adjustable relative to one another and the gap can be altered between values of ⅛ inch and 1 inch.

11. The method of claim 5 wherein the at least one cathode and at least one anode are present in a water remediation and treatment device, the water remediation and treatment device further comprising means for collecting and routing at least one gas wherein the reaction tube assembly further comprises means for collecting at least one gaseous product produced during the electrofloatation process, wherein the collection means includes one of routing hydrogen to a hydrogen cell power source and introducing oxygen into the process stream downstream of the cathode and anode and wherein the method further comprises:

producing at least one gaseous product during electrofloatation, wherein the gaseous product is at least one of hydrogen or oxygen;
where the gas produced is hydrogen, routing the hydrogen to an external hydrogen cell power source;
where the gas is oxygen, introducing the oxygen into the process stream at a location downstream of the at least one cathode and at least one anode.

12. The method of claim 5 wherein the reaction tube assembly is cylindrical and wherein either the cathode or the anode is configured as a cylindrical electrode member and wherein the other of the cathode or anode is positioned radially relative to the cylindrical electrode member and wherein the aqueous process steam travels in a spiral direction relative to the reaction tube assembly.

13. The process of claim 12 wherein the reaction tube assembly has an outer elongated housing having an inlet aperture and an outlet aperture defined therein opposed to the inlet aperture, the outer elongated housing defining an interior reaction chamber and wherein the outlet aperture is located above the inlet aperture when the reaction tube assembly is in a use position.

14. The method of claim 5 wherein in the at least one of the cathode or the anode is configured as a cylindrical electrode member and wherein the other of the cathode or anode is positioned radially relative to the cylindrical electrode member.

15. The method of claim 5 wherein the water remediation and treatment device further includes at least one device configured to remove material accumulated on the surface of the at least one cathode and/or the at least one anode during water treatment, wherein activation of the cathode and anode triggers electrofloatation of at least one target contaminant present in an aqueous process stream passing between the cathode and the anode.

16. A method for remediating water comprising the steps of:
  activating at least one anode and at least one cathode present in at least one reaction tube assembly;
  introducing an aqueous process stream into contact with at the least one activated cathode and the at least one activated anode; and
  maintaining the aqueous process stream in contact with the at least one activated cathode and the at least one activated anode for at least one interval sufficient to trigger linear electrofloatation of at least one target contaminant present in the aqueous process stream, wherein the cathode and the anode are elongated members each having a longitudinal axis and the aqueous process stream introduced into contact with at least one activated cathode and at least one activated anode and passes between the gap defined by the cathode and the anode at an angle oblique to the longitudinal axis of the anode and the cathode,
  wherein in the at least one of the cathode or the anode is configured as a cylindrical electrode member and wherein the other of the cathode or anode is positioned radially relative to the cylindrical electrode member,
  wherein the cylindrical electrode member comprises a first end and an opposed second end, an inwardly oriented face and an outwardly oriented face and at least one longitudinal projection extending from the inwardly oriented face of the cylindrical electrode and extending from the first end of the cylindrical and wherein the cylindrical electrode member is axially moveable relative to the other electrode, the method further comprising the step of cleaning at least one surface of the cylindrical electrode.

17. The method of claim 16 wherein the at least one cathode and the at least one anode operate at a power range between 20 amps and 350 amps and 2 volts and 60 volts.

18. The method of claim 16 wherein the anode and the cathode are present in a reaction tube assembly and the reaction tube assembly of the water remediation and treatment device comprises:
  an outer elongated housing having an inlet aperture and an outlet aperture defined therein opposed to the inlet aperture, the outer elongated housing defining an interior reaction chamber and further defining a fluid flow direction;
  a reaction tube inlet member operatively coupled to the inlet aperture defined in the reaction tube body and to the process channel;
  a reaction tube outlet member operatively coupled to the outlet aperture defined in the reaction tube body and to the process channel;
  the at least one anode positioned in the interior chamber;
  the at least one cathode positioned in the interior chamber, wherein the at least one anode and the at least one cathode are elongated and positioned parallel to the fluid flow direction.

\* \* \* \* \*